(12) United States Patent
Inbar

(10) Patent No.: US 7,847,260 B2
(45) Date of Patent: Dec. 7, 2010

(54) NUCLEAR THREAT DETECTION

(76) Inventor: Dan Inbar, 22 Disraeli Street, Haifa (IL) 34334

( * ) Notice: Subject to any disclaimer, the term of this patent is extended or adjusted under 35 U.S.C. 154(b) by 516 days.

(21) Appl. No.: 11/463,112

(22) Filed: Aug. 8, 2006

(65) Prior Publication Data

US 2006/0289775 A1    Dec. 28, 2006

Related U.S. Application Data

(63) Continuation-in-part of application No. 11/348,040, filed on Feb. 6, 2006.

(60) Provisional application No. 60/649,541, filed on Feb. 4, 2005, provisional application No. 60/651,622, filed on Feb. 11, 2005, provisional application No. 60/654,964, filed on Feb. 23, 2005, now abandoned, provisional application No. 60/706,013, filed on Aug. 8, 2005, provisional application No. 60/706,752, filed on Aug. 10, 2005, provisional application No. 60/707,154, filed on Aug. 11, 2005, provisional application No. 60/709,428, filed on Aug. 19, 2005, provisional application No. 60/710,891, filed on Aug. 25, 2005, provisional application No. 60/596,769, filed on Oct. 20, 2005, provisional application No. 60/596,814, filed on Oct. 24, 2005, provisional application No. 60/597,354, filed on Nov. 28, 2005, provisional application No. 60/597,434, filed on Dec. 1, 2005, provisional application No. 60/597,435, filed on Dec. 1, 2005, provisional application No. 60/597,569, filed on Dec. 10, 2005, provisional application No. 60/597,629, filed on Dec. 14, 2005, provisional application No. 60/767,379, filed on Mar. 23, 2006.

(30) Foreign Application Priority Data

Feb. 6, 2005    (IL)    .................................... 166701

(51) Int. Cl.
    *G01T 1/20*    (2006.01)
(52) U.S. Cl. ............................................... 250/370.11
(58) Field of Classification Search ................. 250/394, 250/390.01, 370.11, 370.08, 370.05, 370.09, 250/336.1; 378/57
    See application file for complete search history.

(56) References Cited

U.S. PATENT DOCUMENTS 2,950,393 A    8/1960    Southward
3,076,895 A    2/1963    Baldwin (Continued)

FOREIGN PATENT DOCUMENTS

CN    1405555    3/2003

(Continued)

OTHER PUBLICATIONS

Slaughter et al. "The"Nuclear Car Wash": A Scanner to Detect Illicit Special Nuclear Material in Cargo Containers", IEEE Sensors Journal, 5(4): 560-564, 2005.

(Continued)

*Primary Examiner*—David P Porta
*Assistant Examiner*—Djura Malevic

(57) ABSTRACT

A detector for detecting radiation, the detector comprising:
  a plurality of elongate scintillator segments arranged in a side by side array; and
  at least one pair of light sensors optically coupled to ends of each of the elongate scintillator such that they receive light from scintillations produced in the scintillator and generate electrical signals responsive thereto.

49 Claims, 14 Drawing Sheets

U.S. PATENT DOCUMENTS

| | | | |
|---|---|---|---|
| 3,381,131 A | 4/1968 | Meal et al. | |
| 3,471,414 A | 10/1969 | Faler | |
| 3,670,164 A | 6/1972 | Hardy et al. | |
| 3,688,113 A * | 8/1972 | Miraldi | 250/366 |
| 3,878,373 A * | 4/1975 | Blum | 250/303 |
| 3,899,675 A | 8/1975 | Floyd | |
| 3,919,557 A | 11/1975 | Berninger | |
| 3,935,462 A | 1/1976 | de Luca et al. | |
| 3,956,654 A | 5/1976 | Gleason | |
| 3,960,756 A * | 6/1976 | Noakes | 252/301.18 |
| 3,970,852 A | 7/1976 | Richey et al. | |
| 3,978,337 A * | 8/1976 | Nickles et al. | 250/367 |
| 3,988,585 A | 10/1976 | O'neill et al. | |
| 4,001,591 A | 1/1977 | Inbar | |
| 4,021,670 A * | 5/1977 | Noakes | 250/328 |
| 4,045,676 A | 8/1977 | Rolle | |
| 4,060,730 A | 11/1977 | Zioni et al. | |
| 4,095,108 A | 6/1978 | Inbar et al. | |
| 4,100,413 A | 7/1978 | Inbar et al. | |
| 4,117,330 A | 9/1978 | Lansiart et al. | |
| 4,143,271 A | 3/1979 | Klein et al. | |
| 4,149,079 A | 4/1979 | Ben-Zeev et al. | |
| 4,179,664 A | 12/1979 | Bedwell | |
| 4,180,736 A | 12/1979 | Goodman | |
| 4,200,803 A | 4/1980 | Becker et al. | |
| 4,217,497 A | 8/1980 | Daniels et al. | |
| 4,243,886 A | 1/1981 | Untermyer, II | |
| 4,262,203 A | 4/1981 | Overhoff | |
| 4,278,885 A | 7/1981 | von Alfthan et al. | |
| 4,291,227 A | 9/1981 | Caldwell et al. | |
| 4,322,617 A | 3/1982 | Parker | |
| 4,343,994 A | 8/1982 | Farcy | |
| 4,350,607 A | 9/1982 | Apfel | |
| 4,358,682 A | 11/1982 | Telfer et al. | |
| 4,369,495 A | 1/1983 | Inbar et al. | |
| 4,393,307 A | 7/1983 | Nozaki et al. | |
| 4,419,578 A | 12/1983 | Kress | |
| 4,424,446 A | 1/1984 | Inbar et al. | |
| 4,426,580 A | 1/1984 | Smith | |
| 4,429,226 A | 1/1984 | Inbar | |
| 4,432,059 A | 2/1984 | Inbar et al. | |
| 4,434,373 A | 2/1984 | Christ et al. | |
| 4,447,727 A | 5/1984 | Friesenhahn | |
| 4,455,616 A | 6/1984 | Inbar | |
| 4,476,391 A | 10/1984 | Bednarczyk | |
| 4,481,421 A | 11/1984 | Young et al. | |
| 4,493,811 A | 1/1985 | Seki et al. | |
| 4,498,007 A | 2/1985 | Schwarzmann | |
| 4,509,042 A | 4/1985 | Kruse | |
| 4,543,485 A * | 9/1985 | Ishii et al. | 250/487.1 |
| 4,568,510 A | 2/1986 | Caldwell | |
| 4,573,122 A | 2/1986 | Inbar et al. | |
| 4,580,057 A | 4/1986 | Sidhwa | |
| 4,582,670 A | 4/1986 | Leon et al. | |
| 4,588,897 A | 5/1986 | Inbar et al. | |
| 4,588,898 A | 5/1986 | Piesch et al. | |
| 4,598,202 A | 7/1986 | Koechner | |
| 4,613,313 A | 9/1986 | Steele | |
| 4,620,100 A | 10/1986 | Schoenig, Jr. et al. | |
| 4,622,466 A | 11/1986 | Tamura | |
| 4,638,158 A * | 1/1987 | Sonne et al. | 250/266 |
| 4,731,535 A | 3/1988 | Rische et al. | |
| 4,823,016 A * | 4/1989 | Yamashita et al. | 250/363.03 |
| 4,841,153 A * | 6/1989 | Wormald | 250/390.04 |
| 4,864,140 A | 9/1989 | Rogers et al. | |
| 4,866,277 A | 9/1989 | Johnson et al. | |
| 4,870,280 A * | 9/1989 | Yamashita et al. | 250/368 |
| 4,937,452 A | 6/1990 | Simpson et al. | |
| 5,034,610 A | 7/1991 | Spacher et al. | |
| 5,041,728 A | 8/1991 | Spacher et al. | |
| 5,078,951 A | 1/1992 | August, Jr. | |
| 5,083,026 A * | 1/1992 | Elbaum | 250/369 |
| 5,155,366 A * | 10/1992 | Miller | 250/368 |
| 5,204,527 A | 4/1993 | Buchanan | |
| 5,315,506 A | 5/1994 | Wang et al. | |
| 5,317,158 A | 5/1994 | Mcelhaney et al. | |
| 5,326,974 A | 7/1994 | Karras et al. | |
| 5,345,084 A * | 9/1994 | Byrd | 250/390.12 |
| 5,440,135 A | 8/1995 | Shonka | |
| 5,457,720 A | 10/1995 | Snyder et al. | |
| 5,517,030 A | 5/1996 | Nabais Conde et al. | |
| 5,532,122 A | 7/1996 | Drukier | |
| 5,638,420 A * | 6/1997 | Armistead | 378/57 |
| 5,675,151 A * | 10/1997 | Oka et al. | 250/368 |
| 5,692,029 A | 11/1997 | Husseiny et al. | |
| 5,721,759 A | 2/1998 | Raatikainen | |
| 5,734,689 A | 3/1998 | Copeland et al. | |
| 5,738,895 A | 4/1998 | Fuchs et al. | |
| 5,753,919 A * | 5/1998 | Prain et al. | 250/368 |
| 5,780,856 A * | 7/1998 | Oka et al. | 250/367 |
| 5,821,541 A | 10/1998 | Tumer | |
| 5,838,759 A | 11/1998 | Armistead | |
| 5,854,489 A | 12/1998 | Verger et al. | |
| 5,880,469 A * | 3/1999 | Miller | 250/367 |
| RE36,201 E * | 4/1999 | Miller | 250/390.04 |
| 6,006,162 A | 12/1999 | Haywood | |
| 6,076,009 A | 6/2000 | Raylman et al. | |
| 6,087,663 A | 7/2000 | Moisan et al. | |
| 6,111,257 A | 8/2000 | Shand et al. | |
| 6,120,706 A | 9/2000 | Lessing et al. | |
| 6,134,289 A | 10/2000 | Peurrung et al. | |
| 6,149,593 A | 11/2000 | Gonzalez-Lepera | |
| 6,169,285 B1 | 1/2001 | Petrillo et al. | |
| 6,175,120 B1 | 1/2001 | McGregor et al. | |
| 6,184,531 B1 | 2/2001 | Smart et al. | |
| 6,194,726 B1 | 2/2001 | Pi et al. | |
| 6,201,257 B1 | 3/2001 | Stettner et al. | |
| 6,201,530 B1 | 3/2001 | Thadani et al. | |
| 6,225,634 B1 | 5/2001 | Atrashkevich et al. | |
| 6,228,664 B1 | 5/2001 | Bronson et al. | |
| 6,255,655 B1 * | 7/2001 | Mc Croskey et al. | 250/363.03 |
| 6,255,657 B1 | 7/2001 | Cole et al. | |
| 6,256,373 B1 | 7/2001 | Bernstein et al. | |
| 6,271,510 B1 * | 8/2001 | Boxen | 250/208.1 |
| 6,285,028 B1 | 9/2001 | Yamakawa | |
| 6,297,506 B1 | 10/2001 | Young et al. | |
| 6,298,113 B1 * | 10/2001 | Duclos et al. | 378/19 |
| 6,300,635 B1 | 10/2001 | Brambilla et al. | |
| 6,341,150 B1 | 1/2002 | Ivanov et al. | |
| 6,362,477 B1 | 3/2002 | Sowerby et al. | |
| 6,362,485 B1 | 3/2002 | Joyce et al. | |
| 6,369,393 B1 | 4/2002 | Jordanov | |
| 6,380,540 B1 | 4/2002 | Maor et al. | |
| 6,380,541 B1 | 4/2002 | Laine et al. | |
| 6,388,260 B1 | 5/2002 | Doty et al. | |
| 6,420,710 B1 | 7/2002 | Verger et al. | |
| 6,423,972 B1 | 7/2002 | Fehrenbacher et al. | |
| 6,448,560 B1 | 9/2002 | Tumer | |
| 6,452,992 B1 | 9/2002 | Umiastowski | |
| 6,456,869 B1 | 9/2002 | Raylman et al. | |
| 6,486,468 B1 | 11/2002 | Lacy | |
| 6,509,563 B1 | 1/2003 | Mcelroy, Jr. et al. | |
| 6,519,306 B1 | 2/2003 | Matsumiya | |
| 6,544,442 B1 * | 4/2003 | Bell et al. | 252/478 |
| 6,596,998 B1 * | 7/2003 | Siedel | 250/370.1 |
| 6,603,122 B2 | 8/2003 | Taleyarkhan | |
| 6,603,124 B2 | 8/2003 | Maublant | |
| 6,610,977 B2 | 8/2003 | Megerle | |
| 6,624,415 B1 | 9/2003 | Hattori et al. | |
| 6,723,996 B2 | 4/2004 | Lebrun et al. | |
| 6,806,475 B1 | 10/2004 | Lightfoot et al. | |
| 6,822,235 B2 | 11/2004 | Ryden | |
| 6,876,711 B2 | 4/2005 | Wallace et al. | |
| 6,906,559 B2 | 6/2005 | Tumer | |

| | | |
|---|---|---|
| 6,944,264 B2 | 9/2005 | Bijjani et al. |
| 6,989,541 B2 * | 1/2006 | Penn ............... 250/390.01 |
| 6,992,313 B2 | 1/2006 | Piestrup |
| 7,026,627 B2 * | 4/2006 | Fowler et al. ............ 250/394 |
| 7,049,603 B2 | 5/2006 | Martoff |
| 7,151,815 B2 | 12/2006 | Ruddy et al. |
| 7,317,195 B2 | 1/2008 | Eikman |
| 7,366,282 B2 | 4/2008 | Peschmann |
| 7,369,640 B2 * | 5/2008 | Seppi et al. ............... 378/9 |
| 7,521,686 B2 * | 4/2009 | Stuenkel et al. ........ 250/390.11 |
| 2001/0048730 A1 | 12/2001 | Oshima et al. |
| 2002/0036270 A1 | 3/2002 | Tumer |
| 2002/0067789 A1 | 6/2002 | Wallace et al. |
| 2002/0125429 A1 | 9/2002 | Lebrun et al. |
| 2002/0175288 A1 | 11/2002 | Taleyarkhan |
| 2003/0006376 A1 | 1/2003 | Tumer |
| 2003/0015655 A1 | 1/2003 | Ryden |
| 2003/0081724 A1 | 5/2003 | Piestrup |
| 2003/0111611 A1 | 6/2003 | Maublant |
| 2003/0116713 A1 | 6/2003 | Cooke et al. |
| 2003/0165211 A1 | 9/2003 | Grodzins et al. |
| 2003/0189510 A1 | 10/2003 | Anderton et al. |
| 2003/0197128 A1 | 10/2003 | Tumer |
| 2003/0205677 A1 | 11/2003 | Caldwell et al. |
| 2003/0226971 A1 * | 12/2003 | Chandross et al. ....... 250/361 R |
| 2004/0000645 A1 * | 1/2004 | Ramsden et al. ........ 250/361 R |
| 2004/0051044 A1 | 3/2004 | Bjurman et al. |
| 2004/0109532 A1 | 6/2004 | Ford et al. |
| 2004/0200966 A1 | 10/2004 | Ramsden |
| 2004/0251419 A1 | 12/2004 | Nelson et al. |
| 2005/0006589 A1 * | 1/2005 | Joung et al. ............ 250/370.09 |
| 2005/0011849 A1 | 1/2005 | Chattey |
| 2005/0017181 A1 * | 1/2005 | Kearfott et al. ......... 250/361 R |
| 2005/0253073 A1 * | 11/2005 | Joram et al. ........... 250/363.03 |
| 2005/0263711 A1 | 12/2005 | Geri et al. |
| 2005/0275545 A1 * | 12/2005 | Alioto et al. ............ 340/600 |
| 2006/0011849 A1 * | 1/2006 | Tseng et al. ............ 250/367 |
| 2006/0017000 A1 | 1/2006 | Martoff |
| 2006/0049357 A1 | 3/2006 | Tumer |
| 2006/0102845 A1 | 5/2006 | Williams et al. |
| 2006/0219932 A1 | 10/2006 | Fellerman et al. |
| 2007/0102646 A1 | 5/2007 | Goldberg |
| 2007/0187608 A1 | 8/2007 | Beer et al. |
| 2007/0205373 A1 | 9/2007 | Kornblau et al. |
| 2007/0210255 A1 | 9/2007 | Bjorkholm |
| 2007/0278423 A1 | 12/2007 | Eikman |
| 2008/0023631 A1 * | 1/2008 | Majors et al. ............ 250/336.1 |
| 2008/0067390 A1 * | 3/2008 | Ramsden et al. ........ 250/361 R |
| 2008/0135772 A1 | 6/2008 | Claus et al. |
| 2008/0175351 A1 | 7/2008 | Norman et al. |

FOREIGN PATENT DOCUMENTS

| | | |
|---|---|---|
| DE | 10149888 | 3/2003 |
| EP | 0003811 | 5/1979 |
| EP | 0060574 | 9/1982 |
| EP | 1026522 | 8/2000 |
| JP | 54082275 | 6/1979 |
| JP | 61149884 | 7/1986 |
| RU | 2129289 | 4/1999 |
| RU | 2150127 | 5/2000 |
| RU | 2150693 | 6/2000 |
| RU | 2158938 | 11/2000 |
| RU | 2161299 | 12/2000 |
| RU | 2191408 | 10/2002 |
| RU | 2196980 | 1/2003 |
| WO | WO 99/03155 | 1/1999 |
| WO | WO 99/22251 | 6/1999 |
| WO | WO 03/048815 | 6/2003 |
| WO | WO 2004/051311 | 6/2004 |
| WO | WO 2004/061448 | 7/2004 |
| WO | WO 2004/092719 | 10/2004 |

OTHER PUBLICATIONS

Prussin et al. "Nuclear Car Wash Status Report", Lawrence Livermore National Laboratory: 1-85, 2005.

Slaughter et al. "Detection of Special Nuclear Material in Cargo Containers Using Neutron Interrogation", Lawrence Livermore National Laboratory, 1-63, 2003.

Official Action Dated Jun. 30, 2008 from the US Patent Office Re.: U.S. Appl. No. 11/348,040.

Official Action Dated Mar. 3, 2009 From the US Patent and Trademark Office Re.: U.S. Appl. No. 11/348,040.

Official Action Dated Nov. 29, 2007 From the US Patent and Trademark Office Re.: U.S. Appl. No. 11/348,040.

Official Action Dated Jun. 30, 2008 From the US Patent Trademark Office Re.: U.S. Appl. No. 11/348,040.

Official Action Dated Aug. 5, 2009 From the US Patent and Trademark Office Re.: U.S. Appl. No. 11/690,150.

Official Action Dated Oct. 27, 2009 From the US Patent and Trademark Office Re.: U.S. Appl. No. 11/348,040.

Response Dated Dec. 3, 2009 to Official Action of Aug. 5, 2009 From the US Patent and Trademark Office Re.: U.S. Appl. No. 11/690,150.

Response Dated Jan. 26, 2010 to Official Action of Oct. 27, 2009 From the US Patent and Trademark Office Re.: U.S. Appl. No. 11/348,040.

Supplemental Repsonse Dated Jan. 26, 2010 to Response of Dec. 3, 2009 to Official Action of Aug. 5, 2009 and to Interview Summary of Jan. 7, 2010 From the US Patent and Trademark Office Re.: U.S. Appl. No. 11/690,150.

Official Action Dated May 25, 2010 From the US Patent and Trademark Office Re.: U.S. Appl. No. 11/348,040.

Notice of Allowance Dated Mar. 26, 2010 From the US Patent and Trademark Office Re.: U.S. Appl. No. 11/690,150.

* cited by examiner

NUCLEAR THREAT DETECTION

RELATED APPLICATIONS

The present application is a continuation in part of U.S. patent application Ser. No. 11/348,040 filed Feb. 6, 2006, which claims the benefit under 35 U.S.C. §1.19(e) of U.S. Provisional Applications 60/649,541 filed Feb. 4, 2005; 60/651,622 filed Feb. 11, 2005; 60/654,964 filed Feb. 23, 2005. This application also claims the benefit under 35 U.S.C. §1.19(e) of US Provisional Applications: 60/706,013 filed Aug. 8, 2005; 60/706,752 filed Aug. 10, 2005; 60/707,154 filed Aug. 11, 2005; 60/709,428 filed Aug. 19, 2005; 60/710,891 filed Aug. 25, 2005; 60/596,769 filed Oct. 20, 2005; 60/596,814 filed Oct. 24, 2005; 60/597,354 filed Nov. 28, 2005; 60/597,434 filed Dec. 1, 2005; 60/597,435 filed Dec. 1, 2005, 60/597,569 filed Dec. 10, 2005; 60/597,629 filed Dec. 14, 2005; and 60/767,379 filed Mar. 23, 2006. The disclosures of all applications are incorporated herein by reference.

FIELD OF THE INVENTION

The present invention is in the field of threat detection and in particular the detection of nuclear/radiological threats.

BACKGROUND OF THE INVENTION

For a number of years governments have been struggling with how to keep terrorists from trafficking in special nuclear materials (SNM) and devices containing such materials and radiological dispersion devices (RDD). Such materials include weapon grade Uranium (WGU) and weapon grade Plutonium (WG) and radioactive sources used for RDD. Such trafficking can take place by people, car, truck, container, rail, ship or other supply chain means. There is a long perceived need for a cost/effective system to screen, detect, locate and identify SNM or RDD materials or devices that are being transported. Furthermore there is a long felt need for an effective means to scan, locate and identify suspected areas in which those threats may be present.

Such screening is difficult in practice due, at least in part, to the environment in which it is done. Firstly, environmental radiation (including terrestrial and atmospheric radiation) of gamma rays and neutrons is substantial. Secondly, benign Normally Occurring Radiological Materials [NORM] like K-40 occur in nature and are present in many benign cargos. For example, kitty litter, plywood, concrete and bananas, emit substantial amounts of benign radiation. Additionally, humans undergoing nuclear medicine imaging or radiation treatment using implanted radioactive seeds can emit sizeable amounts of radiation. These and other "natural" or "benign" sources of radiation: this phenomena coupled with the ability to shield the SNM and RDD, make simple detection schemes either ineffective in finding nuclear radiological threats or prone to a poor receiver operating characteristic (ROC), for example a large percentage of false positives. Substantial numbers of false positives produce a large number of vehicles that have to be searched or otherwise vetted manually, making such simple systems practically useless for screening large numbers of vehicles. At present the leading means to screen RDD and SNM trafficking vehicles are the so called next generation Advanced Spectroscopic Portals (ASP) developed recently for the U.S. DHS DNDO.

More than 90% of the ASP systems use an array of 8 or 16 relatively small NaI(Tl) scintillators (e.g., 0.1×0.1×0.4 meter), to detect the gamma energy spectroscopic signatures of SNM and RDD, and a small array of He-3 Neutron detectors to detect and count neutron emissions. ASP systems do not provide nuclear imaging of either gamma rays or neutrons.

ASP systems detection performance is limited primarily due to the high cost of NaI detectors, which limits the system detection area/sensitivity. Because of the high price and practical cost constraints, the NaI(Tl) and He-3 detectors, their number is small [typically the ASP NaI detectors have a sensitive area is 0.64 meter$^2$] relative to the distance from the threat radiation source, resulting in a small solid angle of the detector as viewed by the threat. This limits the detection sensitivity.

It is noted that while, for a given stand-off distance, the total detected radiation (background radiation and the threat radiation) is proportional to the solid angle subtended by the detectors at the emitting radiation sources, the background radiation sigma (statistical standard deviation) is proportional to the square root of the solid angle. Thus, a 100 fold increase in solid angle (≈detector size) results in a 10 fold increase in detection certainty (number of standard deviations above the mean) to threats in a given screening condition. For example, if the small area (i.e. small solid angle) could reliably detect a source with 10 microCurie of activity, the 100 times larger detector will detect 1 microCurie with the same certainty (same rate of true and false detections, given the same geometry and background radiation).

Furthermore, the ASP detects only one threat signature for WGU and RDD—its gamma spectroscopic signature, since such materials do not emit neutrons in an amount much different from background. For WGP it detects also a second signature its neutron emission. Having only a single signature makes the system less reliable.

In addition, ASP systems do not provide several other SNM-RDD signatures such as 1D, 2D and 3D nuclear imaging, temporally based signatures such as cascade isotopes (e.g. Co$^{60}$) doublets detection and gamma/neutron salvo emanating from spontaneous fission of SNM. Having such additional signatures would improve the ROC.

These and other limitations are known in the art and drove the DHS DNDO to publish the BAA-06-01 document. This publication states the need to come up with transformational technologies which will provide a much better than ASP SNM signatures detection performance, such as lower cost detectors, improved energy resolution detectors, the use of other than gamma energy spectroscopy SNM-signatures (e.g spontaneous fission signature, imaging), detection of incident gamma or neutron directionality and other means that improve the overall system ROC.

The prior art teaches that organic scintillators (OS) provide a highly robust and stable material that is easily formable in many shapes and has the best detection sensitivity when cost per detected Gamma events is considered. On the other hand, there is a common belief in the prior art that organic scintillators, although some non-spectroscopic OS based portals have been used in the past, fail to provide acceptable ROC as they do not provide energy resolution (or at best a very limited one) in the context of nuclear threat detection. This explains why organic scintillators haven not been used for direct gamma spectroscopy isotope identification in nuclear radiological spectroscopic portals (NRSPs) (in the way NaI(Tl) and HPGe detectors are used in ASP) to identify and/or provide reliable energy window of SNM, RDD and NORM selected gamma energies. Furthermore, it is accepted that for all practical purposes screening portals organic scintillators have a poor gamma efficiency or "stopping power" at energies above 300 keV as compared to NaI(Tl). A review of this issue is given in: Stromswold, D. C. et al., "Comparison of plastic and NaI(Tl) scintillators for vehicle portal monitor applications" in: Nuclear Science Symposium Conference Record, 2003 IEEE, Vol (2) pp. 1065-1069. October 2003. The disclosure of this paper is incorporated herein by reference.

In recent studies related to anti-neutrino detection (see http://arxiv.org/ftp/physics/papers/404/0404071.pdf) and in other publication of the same group (see F. Suekane et al., "An overview of the KamLAND 1; K-RCNP International School and mini-Workshop for Scintillating Crystals and their Applications in Particle and Nuclear Physics Nov., 17-18, 2003, KEK, Japan, it has been shown that extremely large (8 meter diameter) expensive (>$100 million, due mainly to the very large detector size and large number of large [18"] photomultiplier tubes (PMTs) used) liquid scintillator detectors can provide gamma energy resolution which is close to that of NaI(Tl). Such devices are not practical for large scale (or even small scale) deployment for threat detection due to their geometry and astronomical cost. The disclosure of this paper is incorporated herein by reference.

R. C. Byrd et al., in "Nuclear Detection to Prevent or Defeat Clandestine Nuclear Attack", IEEE Sensors Journal, Vol. 5 No. 4, pp. 593-609, 2005, present a review of prior art of SNM-RDD screening, detection and identification techniques. The disclosure of these papers is incorporated herein by reference.

In a PNNL report by Reeder, Paul L. et al., "Progress Report for the Advanced Large-Area Plastic Scintillator (ALPS) Project: FY 2003 Final" PNNL-14490, 2003, a PVT light collection efficiency of 40% for a 127 cm long detector is described. It should be noted that a straight forward extension to 4 meters length of the PNNL OS approach would have resulted in less than 25% light collection and less than 15% light collection for a 6 m long detector. The disclosure of the PNNL report is incorporated herein by reference.

Further information on the state of the art can be found in the Background section of and referenced prior art listed and included by reference in the above referenced US patent application and provisional patent applications.

SUMMARY OF THE INVENTION

An aspect of some embodiments of the invention is concerned with a detector for nuclear threat detection.

In an exemplary embodiment of the invention, the detector is segmented such that gamma rays can be transmitted substantially without impediment between segments while light generated by scintillations within a segment stays substantially within that segment.

Optionally, the detector is a planar detector formed as a series of elongate detector segments placed side by side. Preferably, the detector is also segmented in a direction normal to the plane of the detector, by light reflecting, low Z radiation passing barriers, such that light from scintillations that occur at different depths in the detector are confined to the detector segments in which they occur. Since the barriers are substantially transparent to gamma and neutron radiation, gamma and neutron radiation that contains residual energy after a scintillation can pass substantially unimpeded to a different segment. For nuclear threat detection in vehicles, such as trucks and maritime containers a 4 m×4 m×0.5 m detector assembly is typically segmented into 200 elongated segments, each measuring 0.1 m×0.1 m×4 m. However, the cross-section of the elongate segments can have various other forms in addition to the rectangular form indicated above.

In an exemplary embodiment of the invention, at least two photo-sensors, such as a photomultiplier tube (PMT), are optically coupled to the ends of each segment. The coupled photo-sensors collect light from the ends of the scintillator segments.

By comparing the time and/or intensity of the light detected at the two photo-sensors (or signals generated by the photo-sensors in response to the light), the position of the initial scintillation within of the segment can be estimated using one or both of time of flight (TOF) techniques and the ratio of the PMT signals. As the total charge emanating from the two PMTs is integrated, it represents the total collected light, which can be used to determine the deposited energy of the scintillation, especially after the segment is calibrated as described herein.

Thus, a two dimensional array of such elongate segment can be used to localize the position of the incident particle scintillation within the detector assembly in three dimensions. By summing the signals produced by the individual PMTs in response to the scintillations, determine the incident particle energy, assuming full energy deposition within the detector volume.

It should be understood that such scintillators can be made of any scintillating material. However, the present inventor has found that organic scintillators and especially liquid organic scintillators (LS) have the requisite requirements for detection of nuclear threats. Typical LS for use in the invention comprises a cocktail of (for a 4 m×4 m×0.5 m volume detector) 12 kg PPO, 6.3 $m^3$ normal-dodecane and 1.6 $m^3$ pseudo cumene. The barriers can be of any material. One useful material is thin nylon sheets, coated with a thin layer of reflecting paint. In some embodiments of the invention, the segments are formed by creating such partitions in a bath of LS material.

In an embodiment of the invention, the detector is a 2D imaging detector. It is capable of imaging suspected one or both of gamma rays and neutrons. In one embodiment, the detector is fitted with high Z (e.g. lead) collimators for gamma collimation. Alternatively or additionally, the detector is formed of segments, some of which act as collimators for other segments, since they absorb both gammas and neutrons. This second option is also useful for imaging neutrons, which the present inventor believes has never been previously achieved, especially in WGP threat detection devices.

Alternatively or additionally, gross direction capability for both incident gammas and neutrons is achieved even without collimators. As to gamma rays, the incident gamma rays produce a number of scintillations as they travel through the detector segments. The side of the detector, the 2D positions facing the screened item, sub-nanosecond event times, and deposited energy of these scintillations are determined, and a gross direction of incidence of the gamma ray is estimated from analysis of positions of the first and second scintillations. This methodology is especially useful in reducing terrestrial and atmospheric radiation by a veto on particles that most probably come from a direction other than the direction of the screened object. As to neutrons, it is possible to determine if the neutrons entered the detector from the top, sides, front side facing the screened object or rear side facing to screened object, since neutrons of typical WgP spontaneous fission energies are captured within the first 5-10 cm of OS detector material. This enables the rejection of more than a half the environmental neutron radiation and an increase in selectivity (e.g., improved ROC) of the system.

Optionally, since a number of images are obtainable as the vehicle passes the large detector, linear (partial views tomography) using one or two slanted collimation means or transaxial tomography can be performed by using more than two detectors. There is also a possibility to provide concurrently linear and transaxial tomography. Techniques for performing such tomography in the field of X-ray and nuclear tomography are well known, but have not been applied to nuclear threat detection.

An aspect of some embodiments of the invention is concerned with large area detectors (optionally imaging detectors) preferably having >85% stopping power at 0.1-3 MeV gamma energy range suitable for screening a threat "vehicle" such as a person, car, truck, container, package, train, aircraft or boat. Generally speaking, such detectors are very expensive due to the cost of the detector assembly, the costs of scintillators and/or the costs of the relatively large numbers of photo-sensors or direct nuclear detectors like high purity germanium HPGe detectors that are required. A segmented OS (e.g. LS or PVT) detector according to some embodiments of the invention allows for the construction of a large detectors having extremely high sensitivity for both neutrons and gammas, NaI(Tl) like gamma energy resolution, temporal resolution and intrinsic gamma and neutron spatial resolution that are suitable for reliable nuclear/radiological threat detection for the cost of the most advanced prior art methods.

In some embodiments of the invention, the detector, the associated circuitry and software algorithms are capable of identifying and rejecting incident gammas which do not deposit all of their initial energy in the detector. The identification and rejection of so called "escape quanta" events allows for better gamma spectroscopy isotope identification and/or energy windowing.

In some embodiments of the invention a loci dependent light collection efficiency correction is applied to the detector segments energy signals. This correction mitigates a significant variable of loci dependent energy signals, resulting in a better energy resolution.

In a preferred embodiment of the invention, a segmented LS detector having high light reflecting partitions, coupled to PMTs photocathodes which cover more than 73% of the segments cross section is used. In some embodiments, LS filled optical couplers are used to match the sizes of the PMT and the segments. Such segments use OS such as the PPO based LS described above which have a "mean attenuation length" larger than 15 meters and an index of refraction of approximately 1.5 to match the PMT glass index of refraction. The PMT face is preferably in contact with the LS.

This ensemble may, under some circumstances, provide near 50% or even more light collection efficiency, even for long 3-6 meter detector segments. This increases the number of photoelectrons per MeV at the PMTs, resulting in better energy resolution. It should be noted that one of the reasons that the prior art believes that OS detectors had poor gamma spectroscopic ability was the low light collection efficiency of elongated scintillators that might be useful for threat detection.

In some embodiments of the invention an OS scintillator assembly larger than 1×1×0.4 meter is used to allow most of the incident gammas having energies of more than 2.6 MeV to deposit their full energy in the scintillator assembly, thus eliminating most of the gamma energy resolution loss due to escape quanta associated with smaller detectors.

In a typical embodiment, a scintillation detector approximately 50 cm deep can have a 4×4 or 6×4 (length×height) meter front face. Larger devices can be constructed, and smaller sizes, such as 2×2 m can be useful for "car size only" or pallets lanes. Such large detectors have a number of potential advantages. One advantage is that the efficiency of capture of gammas and neutrons emanating from the screened field of view is greatly improved, due to the large subtended angle that they present to the radiation sources. If radionuclide imaging using high Z collimators is implemented this high gamma sensitivity hike is reduced. A second advantage is that the efficiency of detecting temporally coincident SNM RDD signatures like cascaded isotopes and spontaneous fission gamma/neutron salvos is increased. For example, doublet capture is greatly improved, since the probability of doublet capture is roughly the square of the probability of singlet capture. A substantial percentage of doublet capture results in improved discrimination between some doublet emitting threats like $Co^{-60}$ and non-threatening radiation and improved sensitivity to threatening radiation. It should be noted that the probability of random chance detectability of doublets is extremely low as the background radiation rate is low approximately 1-3 kcounts per second per square meter, while the doublets detection temporal coincidence window is short (about 20 nanosec).

Another advantage of large detectors, especially imaging detectors, is the amount of time each portion of a moving vehicle is screened. Taking into account the movement of the vehicle, every portion of a moving vehicle is captured for almost 40 times as long by a four meter long imaging detector as by a detector having an ASP 10 cm detection length in the direction of movement of the vehicle. This allows for $\sqrt{40}$ increase in signal to background radiation discrimination which translates into the detection of threats with less than ⅙ the activity.

Another aspect of this advantage is that compared to the ASP requirement to move the vehicle at 5 MPH, we can theoretically move the vehicle at 5×40=200 MPH and get the ASP number of detected particles. In practice the length of the detector allows screening at highway speeds of 60 MPH while getting close to twice the detectability of an ASP at 5 MPH. Thus, it is possible to get, at highway speed, a higher detectability then that specified for ASP at only 5 MPH.

An aspect of some embodiments of the invention is concerned with a non-imaging and/or imaging detector that can detect both gamma rays and neutrons and provide spectral and/or spatial imaging of the radiation of at least one of the kinds. Optionally, both kinds are screened. This allows for the use of a single detector for sensing a wide range of threat signatures.

An aspect of some embodiments of the invention is concerned with a detector that can identify the general or gross direction of an incident gamma and/or neutron particle independent of the use of a collimator and/or shielding. In an embodiment of the invention, at least some events that are incident from a direction other than a direction from which they are expected when screening an object, can be rejected. This allows for a decrease in background radiation both from environmental radiation and from radiation emanating from other objects (e.g. nuclear medicine patients outside the field of screening). In addition, it enables the rejection of events that enter from the back, sides, top and bottom of the detector. Rejecting events that do not come from the expected direction can increase the reliable threat detectability of the system many fold.

An aspect of some embodiments of the invention is concerned with imaging guided spectroscopy. In this process, the imaging capability of the detector is used to detect point sources that could be identified as an RDD or SNM or a case of NORM point source at some limited probability (e.g. three to four standard deviations over the ocean of background). To further identify if the point source is a benign (e.g. NORM) or threat, a spectroscopic isotope ID is then applied over a limited area (for example, 1 square meter) around the suspected point source. This eliminates from the spectra most of the non-target background radiation, greatly improving the ability to identify the spectral signature of SNM or RDD.

An aspect of some embodiments of the invention is the provision of one or a plurality of energy windowed images on an isotope-by-isotope basis. This technique is used in nuclear medicine imaging to provide maps of individual isotopes. Providing maps for different isotopes in threat detectors improves the image and its point source contrast over the ocean of background radiation.

An aspect of some embodiments of the invention is concerned with an organic scintillator with both intrinsic spatial and temporal resolution and spectrographic properties to discriminate between isotopes. In an embodiment of the invention, the presence of escape quanta can be detected for a given incident particle, and the event vetoed. This can provide a significant improvement in spectroscopic isotope identification.

The combination of high light detection efficiency and high and uniform collection efficiency associated with loci dependent light collection variation correction and the small rate of escape quanta (due to the large detector) allows for gamma spectroscopic isotope I.D. that is similar to that of detectors with NaI(Tl) scintillators. It should be noted that the exact design of the detector is dependent on a tradeoff between gamma spectroscopic identification and imaging capability. If imaging capability is desired, then some kind of collimation may be required. This reduces the capture efficiency based threat signatures performance. On the other hand, if high particle collection efficiency is desired, for spectroscopy, and temporal coincidence signatures (e.g. cascading isotopes I.D. spontaneous fission gamma/neutron I.D.) detection (discussed below) no collimators are more desirable. In some embodiments, a combination of areas that have collimation and areas that do not have collimation provide a compromise design. Such embodiments are discussed herein.

An aspect of some embodiments of the invention is related to a novel class of detectors which combines high spatial resolution over some areas of the detector and high system sensitivity over the other areas of the detector.

As indicated above, only gross directionality of the incoming radiation can generally be determined without collimation.

In particular, it is noted that gamma rays give up their energy in an organic scintillator material, in a series of time and geometrically spaced events (e.g. Compton interactions), each of which produces a separate scintillation. In general, it is preferred to have the size of the segments matched to a mean length between scintillations (this indicates a compromise between low [100 KeV gammas having a short distance] and high energy gammas [2.6 MeV having a long distance]), such that the position of each event in the detector is, with high probability, in a different segment. The time constant of a single scintillation is the same order of magnitude (a few nsec) as the time between scintillations of the same event, hence they can not easily be discriminated from each other by time. If, however, they occur in different segments, their leading edge timestamp, deposited energy and 2D location are separately detected and measured. This allows the use of algorithms used in Compton imaging techniques to detect the gross directionality of the incident gamma. This allows rejection of gammas that are incident from the back face and to a great extent terrestrial and atmospheric gammas and neutrons.

The requirements for neutron detection are different. In general, the energy (other than the rest energy) is given up over a short path length. This path length is within one or two segments and thus only gross direction can be determined for such events, for example whether the neutron entered the front detector face, the top or the back detector face.

To determine improved directionality for either type of particle, some collimation is often desirable. Since the spatial resolution required is very modest (~0.4-1 Meter FWHM), the collimation can be modest as well.

In an embodiment of the invention, some areas of the detector have relatively high collimation and other areas have low or no collimation, but are relatively thick. In a preferred embodiment of the invention, the thick and thin areas are interleaved and the thick areas provide some or all of the collimation of the thin areas. This detector self-collimation method allows for imaging of both gammas and neutrons.

In some embodiments of the invention, collimation is applied only for gamma rays and optionally only over a part of the detector to allow for both imaging and high detection (capture) efficiency.

In general, in prior art nuclear threat detection systems the detection sensitivity for gamma rays is so small (due to the small size of the detectors) that the detection rate for doublets does not allow for consideration of doublets or spontaneous fission γ/N salvos, for identification of cascading sources.

An aspect of some embodiments of the invention is related to multi-lane chokepoints where a single detector is used to scan threats in lanes on both sides of the detector. Thus, it is possible to scan N lanes nuclear threat portals in which only N+1 detectors are used instead of 2N detectors to form gamma and/or neutron screening of threats in adjoining lanes. This saving in number of detectors uses the unique property of the detector to identify whether an incident gamma and/or neutron entered from the back or front of each detector assembly.

An aspect of the invention is concerned with screening for vehicles moving at highway speeds. As this design allows the fabrication of 4-6 meter long detectors (in the vehicle's travel direction) vs. the 0.1 meter of ASP, the detection sensitivity is 40-60 times that of an ASP. Thus, detectors of the type described herein can provide sensitivity to a target moving at 60 mph that is >3 times that for ASP for targets that move at 5 mph. This level of sensitivity opens the possibility of screening of vehicles in highway traffic.

Optionally, the detector is covertly mounted in a screening vehicle providing a roadside and on the road moving optionally covert screening portal.

Optionally, the detectors can be covertly mounted under the road and/or in tunnels, walls or bridges.

While the invention is described mainly with respect to closely packed segments with rectangular cross-sections, in some embodiments of the invention the individual detector segments have non rectangular cross section such as a cylindrical form to improve the scintillation light collection efficiency to improve light collection efficiency and/or uniformity thus improving gamma energy resolution. Alternatively or additionally, the segments are spaced from each other.

In some embodiments of the invention, the SNM-RDD screening portal images are fused or correlated with CCTV imaging of the vehicle. The position of the image in the vehicle can be used as an indicator of whether the detected material is a threat. This has been discussed in the above referenced regular U.S. patent application Ser. No. 11/348,040.

In some embodiments of the invention, the partitioning of the large detector consists of various sizes of detector sections, with smaller partitions being used near the front face of the detector.

There is thus provided, in accordance with an embodiment of the invention, a detector for detecting nuclear radiation threats, the detector comprising:

a plurality of elongate scintillator segments arranged in a side by side array; and at least one pair of light sensors optically coupled to ends of each of the elongate scintillator segments such that they receive light from scintillations produced in the scintillator segments and generate electrical signals responsive thereto.

In an embodiment of the invention, the segments are separated by partitions that are substantially transparent to gamma radiation and are reflectors for light.

Optionally, the segments are contiguous, separated only by said partitions. Alternatively, the scintillator segments are at least partly non-contiguous.

Optionally, the segments have a rectangular cross-section perpendicular to the elongate direction. Alternatively, the segments have a circular cross-section perpendicular to the elongate direction.

In an embodiment of the invention, the scintillator segments comprise an organic scintillator, optionally a liquid organic scintillator.

Optionally, the light sensors have input face plates and wherein the faceplates are in direct contact with the liquid organic scintillator.

Optionally, the detector includes:

a controller that receives the electrical signals and generates an image of the sources of radiation that cause the scintillations.

Optionally, the scintillator produces scintillations responsive to incoming neutrons, and the detector further comprises:

a controller that receives the electrical signals and determines the positions of the incident neutrons on the detector.

Optionally, the scintillator produces scintillations responsive to incoming neutrons, and the detector further comprises:

a controller that receives the electrical signals and generates an image of the sources of neutron radiation that cause the scintillations.

Optionally, the detector includes:

a controller that receives the electrical signals, and produces an energy value, the energy value being responsive to the electrical signals, wherein the energy value is corrected based on the location of the scintillation within the scintillator segment.

In an embodiment of the invention, the detector includes:

a plurality of collimators on a front face of the organic scintillator that block radiation that would be detected by the said detector from parts of the radiation field.

Optionally, the plurality of collimators restrict block radiation over only a portion of the front face.

Optionally, the plurality of elongate scintillators form a detector having a front face having a total area greater than 1 meter by 1 meter.

In an embodiment of the invention for detecting nuclear threats that generate one of both of neutrons and gammas, wherein the photo-detectors receive light of scintillations in the liquid organic scintillator caused by gammas and neutrons; and including:

a controller that receives the electrical and generates both a count of the incident neutrons and a spectroscopic energy analysis of the gammas.

In an embodiment of the invention, wherein the plurality of elongate scintillators form a detector having a front face and a back face and the scintillators produce scintillations in response to radiation that enters the detector via the front face and the back, the detector comprising:

a controller that receives the electrical signals, and discriminates between the radiation entering the front and rear faces.

In an embodiment of the invention where the plurality of elongate scintillators form a detector having a front face, the detector comprising:

a controller that receives the electrical signals, generates a gross direction of incidence of the incident radiation from said signals, without considering the presence or absence of collimation and rejects at least some incident radiation particles that do not come from a direction at which a suspected source is situated.

In an embodiment of the invention where the plurality of elongate scintillators form a detector having a front face, the front face is not flat, and alternating portions of the front face extend further front than other portions.

In an embodiment of the invention a plurality of said arrays are stacked in a direction perpendicular to the direction of said array to form a three dimensional array of said elongate scintillator segments.

In a embodiment of the invention the plurality of segmented detectors comprise a plurality of segments formed of a series of light reflecting low atomic weight partitions placed in a vessel filled with liquid scintillator material, such that the partitions form the individual elongate segments.

Optionally, the detector includes:

a controller that receives the electrical signals and generates a timestamp reflecting the time that the light arrives at the photo-detector.

Optionally, the sum of the signals relating to an incident particle is proportional to the total energy deposited in the detector by the incident particle.

Optionally the light sensors are photomultiplier tubes (PMTs).

Optionally, the controller corrects the timestamps for systematic variations of PMT light channel delays.

Optionally, the controller corrects the signals for loci dependent light collection efficiency systematic variations.

Optionally, the thickness of the stacks is deep enough to allow full energy deposition in the detector for more than 60% of 2.6 MeV gamma particles incident at the center of the front face.

Optionally the detector is utilized in a screening portal having a lane, wherein a detector is placed at one side of the lane, or on each side of the lane.

Optionally, a plurality of detectors are spaced to form a plurality of vehicle lanes and where a single detector is utilized to detect radiation from adjoining lanes.

Optionally the detector is utilized in a screening portal having a lane wherein the at least one detector surrounds at least 50% of the lane.

Optionally the detector is utilized in a screening portal having a lane wherein the at least one detector surrounds at least 75% of the portal opening or completely surrounds the portal opening.

Optionally, the detector is mounted in a vehicle to provide a portable nuclear threat screening device.

Optionally the detector includes a controller that identifies a plurality of scintillations as emanating from a single incident particle based on a time window within which they fall and their spatial proximity within the detector.

Optionally, the detector function is disguised or hidden so that it detects threats in a covert manner.

Optionally, the detector includes:

a source of activating radiation that stimulates emission of radiation from SNM and radiation shielding materials, wherein the scintillator segments are positioned to receive said stimulated emission.

Optionally the detector includes:

a controller that receives the electrical signals and generates a tomographic image of sources of the radiation.

Optionally, the scintillator is a PPO based liquid scintillator.

There is further provided, in accordance with an embodiment of the invention, a system for detection of radiation signatures of SNM and RDD devices and materials from a screened object, comprising:

at least one scintillator which produces scintillations when impinged by gamma and neutron radiation;

a plurality of optical sensors optically coupled to the at least one scintillator such that they receive light from scintillations produced in the scintillator and generate electrical signals responsive thereto; and a controller that receives the signals and performs a multi-signature detection of threats including a plurality of the following threat detection inputs or characterizations:

(a) gamma spectroscopy isotope signature;
(b) gamma imaging morphologic signature;
(c) neutron counting;
(d) neutron imaging;
(e) cascaded isotopes doublets or triplets signature;
(f) SNM spontaneous fission signature;
(g) comparison with optical images of the screened object; and
(h) gross directionality of incidence of radiation as compared to the direction of the screened object.

Optionally, the at least one scintillator comprises a segmented organic scintillator comprising at least four elongate segments.

Optionally, the scintillator comprises a liquid scintillator.

Optionally, the detector comprises at least three, four, five or more of said threat detection inputs or characterizations.

There is further provided, in accordance with an embodiment of the invention, a detector for detecting incident neutrons, comprising;

at least one scintillator that produces scintillations responsive to incoming neutrons produced by WPG;

a plurality of photo-detectors that receive light of the scintillations and produces electrical signals responsive thereto; and a controller that receives the electrical signals and generates an image of the sources of neutron radiation that cause the scintillations.

There is further provided an SNM detection system, effective to screen vehicles moving at a velocity greater than 40 MPH.

There is further provided a method of SNM detection comprising screening a suspected item by placing it before at least one detector while the item is stationary to increase the number of radiation events captured by the detector.

There is further provided, in accordance with an embodiment of the invention a detector for detecting radiation, comprising:

an organic scintillator;

a plurality of photo-detectors that receive light of scintillators in the organic scintillator and generates electrical signals responsive thereto; and a controller that receives the light and generates an image of the sources of radiation that cause the scintillations.

There is further provided, in accordance with an embodiment of the invention a detector for detecting incident neutrons, comprising;

a scintillator that produces scintillations responsive to incoming neutrons;

a plurality of photo-detectors that receive light of the scintillations and produces electrical signals responsive thereto; and a controller that receives the electrical signals and determines the positions of the incident neutrons on the detector.

There is further provided, in accordance with an embodiment of the invention a detector for detecting radiation, comprising:

an organic scintillator element;

a plurality of light sensors functionally connected to the scintillator such that they receive light from scintillations produced in the scintillator and generate electrical signals responsive thereto; and a controller that receives the electrical signals, and produces an energy value, the energy value responsive to the electrical signals, the energy value being corrected based on the location of the scintillation within the scintillator element.

There is further provided, in accordance with an embodiment of the invention a detector for detecting radiation, comprising:

an organic scintillator;

a plurality of light sensors functionally connected to the scintillator such that they receive light from scintillations produced in the scintillator and generate electrical signals responsive thereto; and a plurality of collimators on a front face of the organic scintillator that restrict the field of view of portions of the scintillator.

Optionally, the plurality of collimators restrict the field of view over only a portion of the front face.

There is further provided, in accordance with an embodiment of the invention a detector for detecting radiation, comprising:

an substantially planar organic scintillator having an input face greater than 1 meter by 1 meter;

a plurality of light sensors functionally connected to the scintillator such that they receive light from scintillations produced in the scintillator and generate electrical signals responsive thereto; and a controller that receives the electrical signals, and produces an energy value, the energy value responsive to the electrical signals, the energy value being corrected based on the location of the scintillation within the scintillator element.

There is further provided, in accordance with an embodiment of the invention a detector for detecting nuclear threats that generate one of both of neutrons and gammas, the detector comprising:

a liquid organic scintillator that produces light scintillations responsive to interactions with gammas and neutrons that are incident thereon;

a plurality of photo-detectors that receive light of scintillations in the liquid organic scintillator and generates electrical signals responsive thereto; and a controller that receives the electrical signals and generates both a count of the incident neutrons and a spectroscopic energy analysis of the gammas.

There is further provided, in accordance with an embodiment of the invention a detector for detecting radiation, comprising:

a substantially planar scintillator having at least a front and back side;

a plurality of light sensors functionally connected to the scintillator such that they receive light from scintillations produced in the scintillator from radiation that enters the scintillator via the front and rear faces and generate electrical signals responsive thereto; and a controller that receives the electrical signals, and discriminates between the radiation entering the front and rear faces.

There is further provided, in accordance with an embodiment of the invention a detector for scanning to determine a source of radiation, comprising:

a substantially planar scintillator having a front surface for receiving radiation;

a plurality of light sensors functionally connected to the scintillator such that they receive light from scintillations produced in the scintillator from radiation that enters the scintillator and generate electrical signals responsive thereto; and a controller that receives the electrical signals, generates a gross direction of incidence of the radiation from said signals, without considering the presence or absence of collimation and rejects at least some scintillations that do not come from a direction at which a suspected source is situated.

There is further provided, in accordance with an embodiment of the invention a detector for detecting radiation, comprising:

an organic scintillator unit having a front face and a back; and a plurality of light sensors functionally connected to the scintillator such that they receive light from scintillations produced in the scintillator from radiation that enters the scintillator and generate electrical signals responsive thereto;

wherein the front face is not flat, and wherein alternating portions of the front face extend further front than other portions.

BRIEF DESCRIPTION OF THE DRAWINGS

Exemplary, non-limiting, embodiments of the invention are described below in conjunction with the following drawings, in which like numbers are used in different drawings to indicate the same or similar elements.

DETAILED DESCRIPTION OF EXEMPLARY EMBODIMENTS

Figure 1:
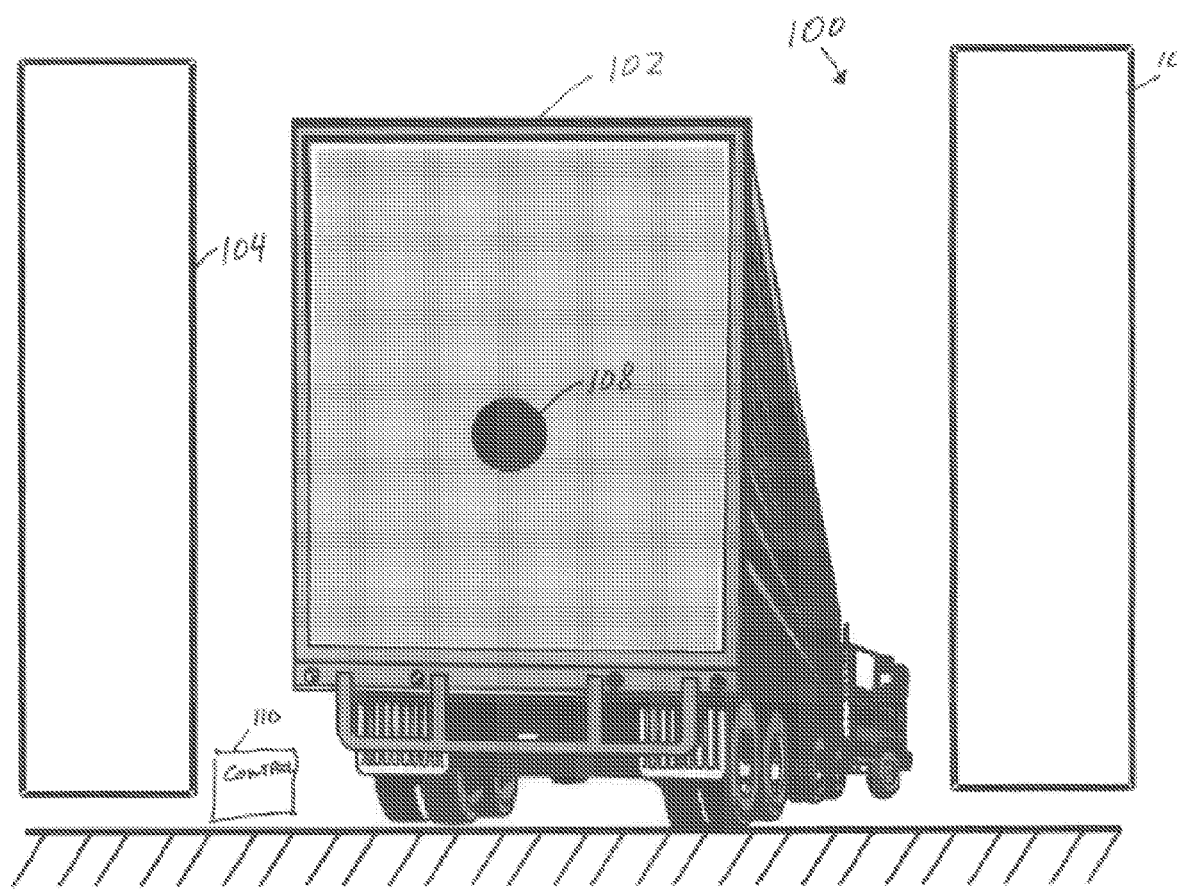
FIG. 1 is a schematic drawing illustrating a general view of part of a threat-detecting portal in accordance with an embodiment of the invention.

FIG. 1 shows a schematic drawing of a portion of a system 100 for detecting nuclear threats. As illustrated, vehicles 102, for example a truck, pass between two detectors 104, 106. In some embodiments only a single detector is used and in some, as described below, three or more such detectors are used. In a preferred embodiment of the invention, the detectors are of one of the types of detectors described below. The detectors are optionally high enough to cover the entire height of the truck or other objects being scanned. The length of the detector (in the direction of motion of the vehicle) is not related to the height; however in some embodiments of the invention it is made 3, 4, 6 or more meters long, so as to provide a desired detection sensitivity.

For illustration purposes, vehicle 102 is shown carrying a nuclear material 108.

A controller 110 receives signals from the detectors and based on these signals, and optionally on information regarding the speed and location of the vehicle, determines whether a possible threat is present. In the event that a threat is determined, the vehicle is either stopped for further checking or sent to additional screening stations, as described with respect to FIG. 30 of the above-referenced U.S. patent application Ser. No. 11/348,040.

Figure 2A:
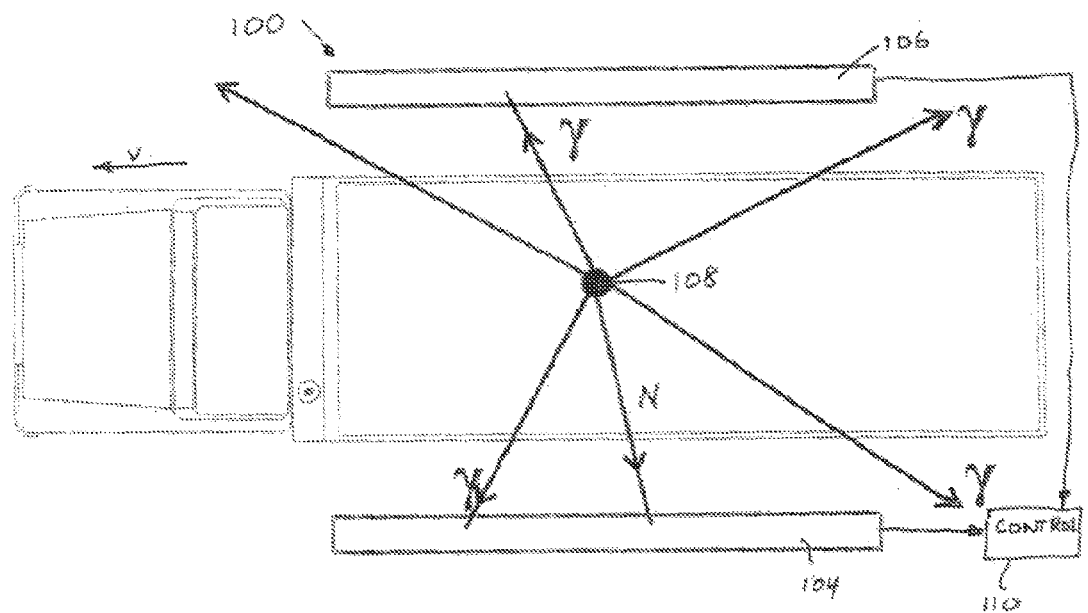
FIGS. 2A and 2B illustrate two kinds of events that occur in nuclear threat materials.
Figure 2B:
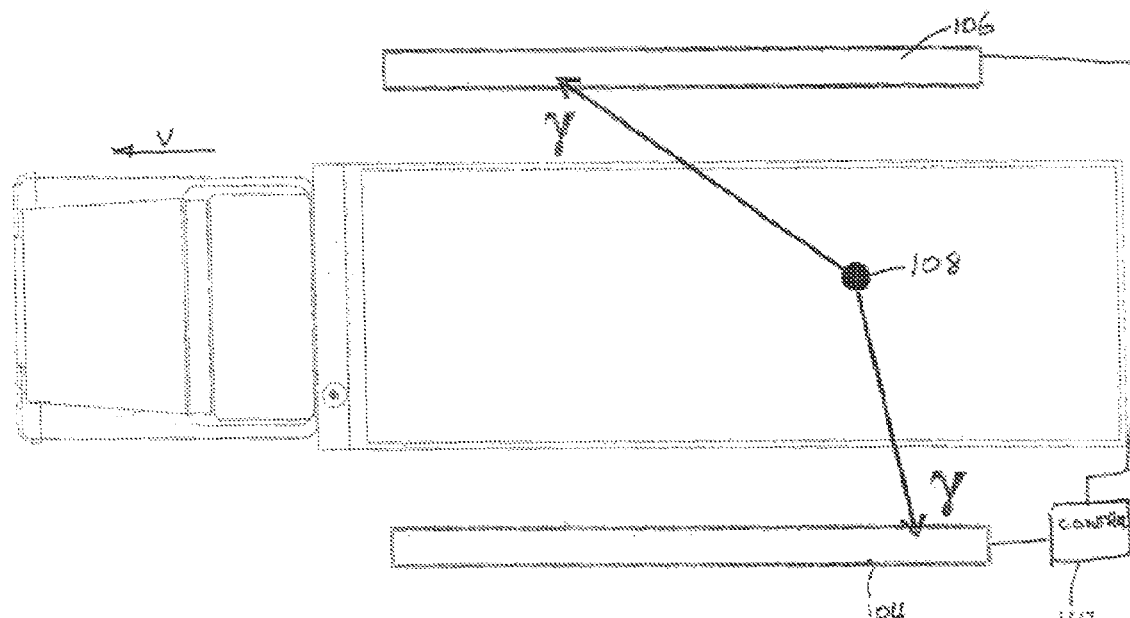

FIGS. 2A and 2B schematically illustrate common types of emissions that occur from nuclear threat material 108. FIG. 2A shows nuclear material (e.g. WGP) emitting both gamma rays and neutrons. The rate of emission is generally rather low and the events illustrated do not occur simultaneously, and can generally be discriminated between by the detectors 104, 106. In cases where simultaneous γ and neutrons as produced, they are generally separated in space (in different segments) so that they can be distinguished. It should be noted that some of the emitted particles are not directed toward the detectors. In addition to emissions in the forward and backward directions, emissions take place in a direction above and below the detectors, since the emission from the threat material is generally isotropic. In general the capture efficiency of any detector or set of detectors is proportional to the solid angle subtended by the detector as seen by the source of emissions, and its stopping power. Thus, the larger the detectors the greater the capture efficiency (sensitivity).

FIG. 2B shows a cascade gamma event in which a first gamma ray is emitted in a first transition and a second gamma ray is emitted in a second emission immediately afterward. Such cascaded emissions are characteristic of some radioactive isotopes, such as $Co^{60}$, and can form a very sensitive signature for recognition of such materials. These two cascaded emissions are shown as being directed to different detectors, however, in practice, there is virtually no correlation between the directions of the gamma rays and they can be directed to the same detector or more likely, only one of the events will be detected. Since the probability of detecting a single gamma event is proportional to the solid angle subtended by the detectors, the probability of detecting doublets is proportional to the square of the solid angle. Thus, the size of the detector is critical to the detection of doublets.

Figure 3:
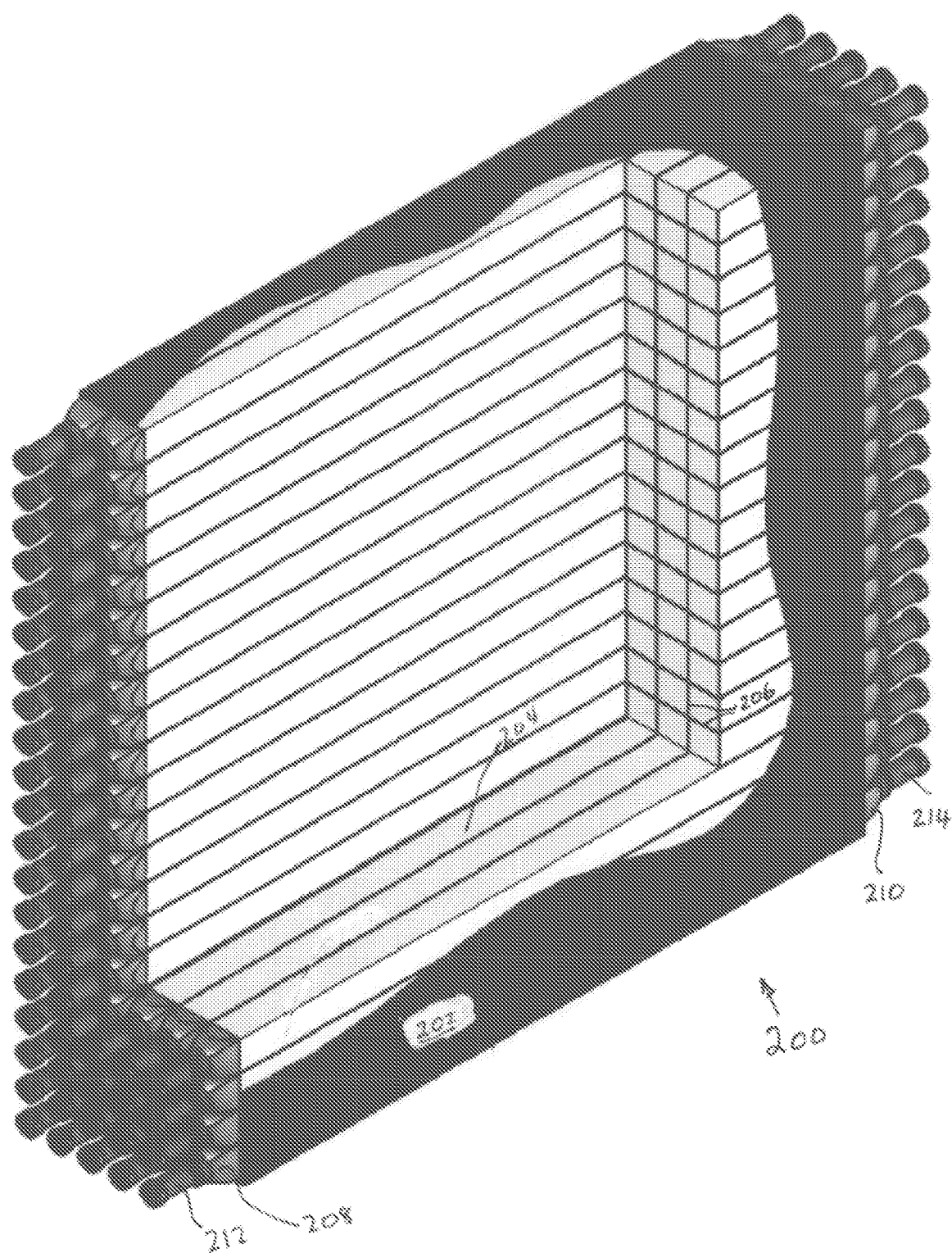
FIG. 3 is a partial cut-away drawing of a detector assembly in accordance with an embodiment of the invention.

FIG. 3, shows a partial cut-away view of a segmented detector 200 (corresponding to detectors 104 and 106 of FIG. 1, in an embodiment of the invention). In the following discussion, the visible face of the detector is referred to as a front face 202 and the other face, as the rear face.

Figure 4A:
FIGS. 4A and 4B are plane views of two types of elongated detector segments, in accordance with an embodiment of the invention.

As shown in the exemplary embodiment of FIG. 3 and referring also to FIG. 4A, detector 200 is segmented into elongate segments of scintillation material (one of which is referenced with reference numeral 204) by reflective partitions 206. Thus, light from a scintillation which occurs in a particular segment is reflected from the partitions and remains in the same segment. By the nature of the reflections, the light is reflected toward one or the other end of the elongate segment, where it is optionally concentrated by a light concentrator before being sensed by a light detector such as a photomultiplier tube (PMT). Two light concentrators 208 and 210 and two PMTs 212 and 214 are shown on either end of the elongate scintillation material. Preferably, the scintillation material is an organic scintillator and more preferably a liquid organic scintillator (LS) material. Typical LS for use in the invention comprises (for a 4 m×4 m×0.5 m volume detector) a cocktail of 12 kg PPO, 6.3 $m^3$ normal-dodecane and 1.6 $m^3$ pseudo cumene. The barriers can be made of low Z materials. One useful material is thin nylon sheets, coated with a thin layer of reflective paints. It should be noted that the PPO Based LS cocktail mentioned above provides extremely good transparency (20 m light loss distance) and an ideal index of refraction (1.5) and a scintillation light spectrum which matches the sensitivity spectrum of Bi-Alkali photocathodes. It should be also noted that the light concentrators are preferably filled with the LS.

Organic scintillators have various advantages over other scintillators, including robustness, stability and low cost, ease of manufacturing and forming, etc. Its two major deficiencies relative to the commonly used NaI(Tl) scintillator is lower stopping power and lower scintillation efficiency of about 10.000 Photones/Mev. Both of these deficiencies are compensated for in some embodiments of the invention.

Organic scintillator materials are well known and have been used for simple detectors which are not used for gamma spectroscopic applications nor for imaging applications.

Figure 4B:
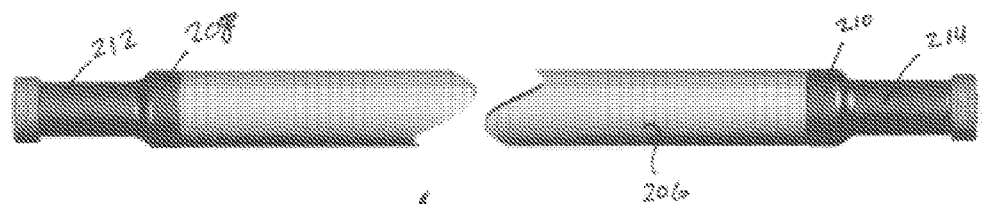

FIG. 4B is similar to FIG. 4A except that the segment cross section is round. It should be noted that while there are spaces between the segments when they are arranged as in FIG. 3, this does not effect operation substantially, since these spaces do not interact significantly with the gamma rays. In an embodiment of invention the individual detector segments have a cylindrical form to improve the scintillation light collection efficiency.

While the rectangular segments can be either self supported or partitions within a bath, it is believed that cylindrical segments have to be self supported.

Alternatively or additionally, the rectangular segments are spaced from each other.

If solid OS segments are used, then the construction is simpler and all that is need is to form the segments and paint them with light reflecting paint.

When a scintillation takes place, the light generated is emitted in all directions. Thus, some of the light travels toward one end and is detected by one of the PMTs and some travels in the other direction and is detected up by the other PMT. Any light photons that are not directly aimed along the elongated segment, will reflect off the reflective walls, possibly multiple times and arrive at the end with a slight delay compared to the directly aimed photons. Since the velocity of light in the scintillation medium is known, the time difference between the 'leading edge' of the light signal by the two PMTs is indicative of the position of the interaction along the length of the segment. This method is known in the art as Time of Flight (TOF) localization. In addition since there is some path length dependent attenuation of the light as it travels through the scintillator material, the amplitude of the light is different at the two ends if the scintillation does not occur at the exact midpoint. In an embodiment of the invention one or both of the TOF and amplitude ratio are used to determine the position of the scintillation along elongate segment 204.

Since both time differences and amplitude ratio are affected by other factors, the segments are preferably calibrated using a procedure described below.

As was shown in the incorporated regular U.S. patent application Ser. No. 11/348,040, with respect to FIGS. 27-29, elongate detectors can be used as threat detectors with one dimensional position discrimination. As can be seen from FIG. 3 of the present application, segments 204 are stacked vertically. Thus, each such stack will provide information as to position of a scintillation occurring at its depth in both the vertical and horizontal directions, i.e., two dimensional position detection. It is noted that the depth of the detector does not by itself provide a 3D image.

Scintillation materials of the preferred type detect both neutrons and gamma rays. However, the footprints of scintillations that are produced are different. In both cases, the energy of the incoming radiation is given up via a series of interactions, which result in scintillations. However, the distance between such events is different, being substantially longer for the gamma rays than for neutrons of typical energies. In an embodiment of the invention, the depth and height of the segments is such that, in many cases, a single scintillation takes place in a particular segment for gamma rays and multiple interactions, even most of the interactions, take place in a same segment for neutrons of energies that are expected from fissile materials.

Another difference is the scintillation rate of decay for the two types of interactions, especially when all the scintillations caused by an incoming event is considered. This phenomenon is well known and has been used to discriminate between gamma rays and neutrons in non-imaging detectors using PSD methods.

In threat detectors the rate of incoming events is generally low at rates of a few thousand counts per second per $meter^2$. At such low rates, the probability that two scintillations from different incident gamma events will take place in a nearby location at the same time window is low, hence each incident particle and its associated scintillations can be analyzed individually. If the signals produced by the PMTs are time stamped and digitized, then scintillations in different segments can be correlated and the positions of a series of scintillations caused by a single incident particle can be correlated. The utility of this information will be described below.

In the preferred embodiment of the invention, the partitions are substantially transparent to gamma rays and other quanta such as higher energy electrons, neutrons and protons. Thus, while light is trapped within a particular segment, residual energy, in the form of a gamma ray, or other quanta, not converted to light (or heat) in a particular interaction can pass through the partition into a neighboring (or farther) segment.

In an exemplary embodiment detector 200 comprises a plurality of layers of segments, arranged in the direction perpendicular to front face 202, as shown in FIG. 3. Thus, an incoming incident gamma event will cause a series of scintillations as it interacts with the detector. Often, depending on the incident gamma energy, each scintillation takes place in a different segment.

Figure 5:
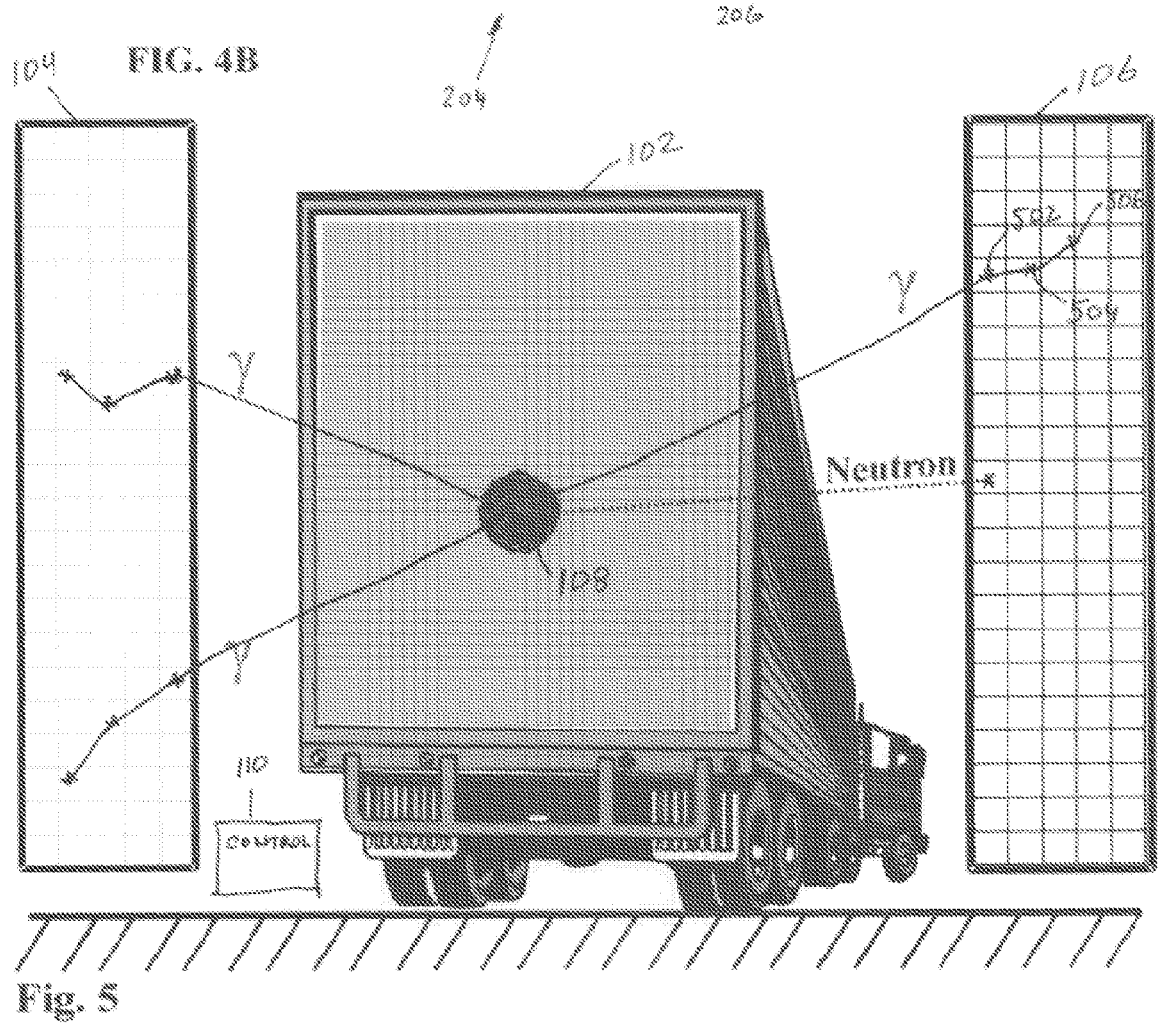
FIG. 5 is a schematic drawing similar to FIG. 1, which also illustrates the incident gamma and neutron interactions which take place in detectors of the type described with respect to FIGS. 3, 4A and 4B.

FIG. 5, which is similar to FIG. 1 except that gamma and neutron events and the train of scintillations they cause are shown.

As shown in FIG. 5, nuclear material 108 emits both gamma and neutrons particles. The neutrons cause a series of scintillations, generally in one segment. These scintillations are treated as a single scintillation. This series of scintillations can be identified as being generated by a fast neutron, from a characteristic pulse shape measured by PMTs 212 and 214 (FIGS. 3 and 4). It is noted that a further large scintillation at 2.2 MeV caused by the thermalized (slowed down) neutron capturing on Hydrogen may optionally be considered as an additional correlation, although the time delay for that secondary event is longer and randomly variable. Incoming gamma rays generate a more complex pattern of scintillations. As indicated above, the mean distance between scintillations could be large as compared with the cross-sectional dimensions of segments 204. Thus, some gamma event causes a series of distinct scintillations as it moves through the detector and gives up energy. One such series is indicated by reference numerals 502, 504 and 506.

A statistical most probable incoming direction of the event can be calculated. This direction is only a gross direction and is generally not sufficiently good for imaging. However, it does enable substantial rejection of background radiation such as terrestrial and atmospheric radiation. This is based on the fact that the direction of the gamma particle having the residual energy after Compton an interaction is related to the incoming direction. Generally, the most probably incoming direction is a straight line between the first and second scintillations.

It should be noted that since detector 200 collects light from all of the scintillations caused by the incident gamma rays, the light collected by scintillator 204 can be used for spectroscopic isotope identification. The spectral resolution depends on a number of factors, some of which are correctable. One of these is a systematic variation in light collection efficiency as a function of position of the scintillation within a segment. In general, the main variable in this respect is the distance and average number of reflections that light from a scintillation event has to undergo in order to reach each of the photomultiplier tubes. This can be calculated (or measured for a typical segment, as described below) and an appropriate correction made to the energy signal (integral of the light received) indicated at the front-end electronics or system software, based on the determined scintillation position along the segment.

Other correctable variations are gain and delay variations among the individual PMTs. These can also be determined as part of an overall calibration for the segment.

In an experimental calibration of loci dependent light collection efficiency variation correction, according to an embodiment of the invention, a point source of mono-energetic gamma rays or high energy mono-energetic betas is placed adjacent to an individual segment and the energy signals provided by the sum of the two PMTs is measured. This is repeated for a number of positions along the length of the segment. Interactions between the OS material in the segment and the ray will cause scintillations. The signals generated by these scintillations in the PMTs at the end of the segments can be used to define a ratio of signals and a time delay between signals as a function of actual position along the segment.

For betas, the entire energy is transferred in a single interaction. However, for gamma, the energy transferred in the interactions (and the energy in the scintillations) is variable. However, the peak energy scintillations can be assumed to be the result of a direct photoelectric effect interaction (or otherwise a full energy deposition within the segment) and thus their energy is known (i.e., it is the energy of the incoming gamma). This known energy and position can be used as a standard for generating a position dependent energy correction table.

Figure 12A:
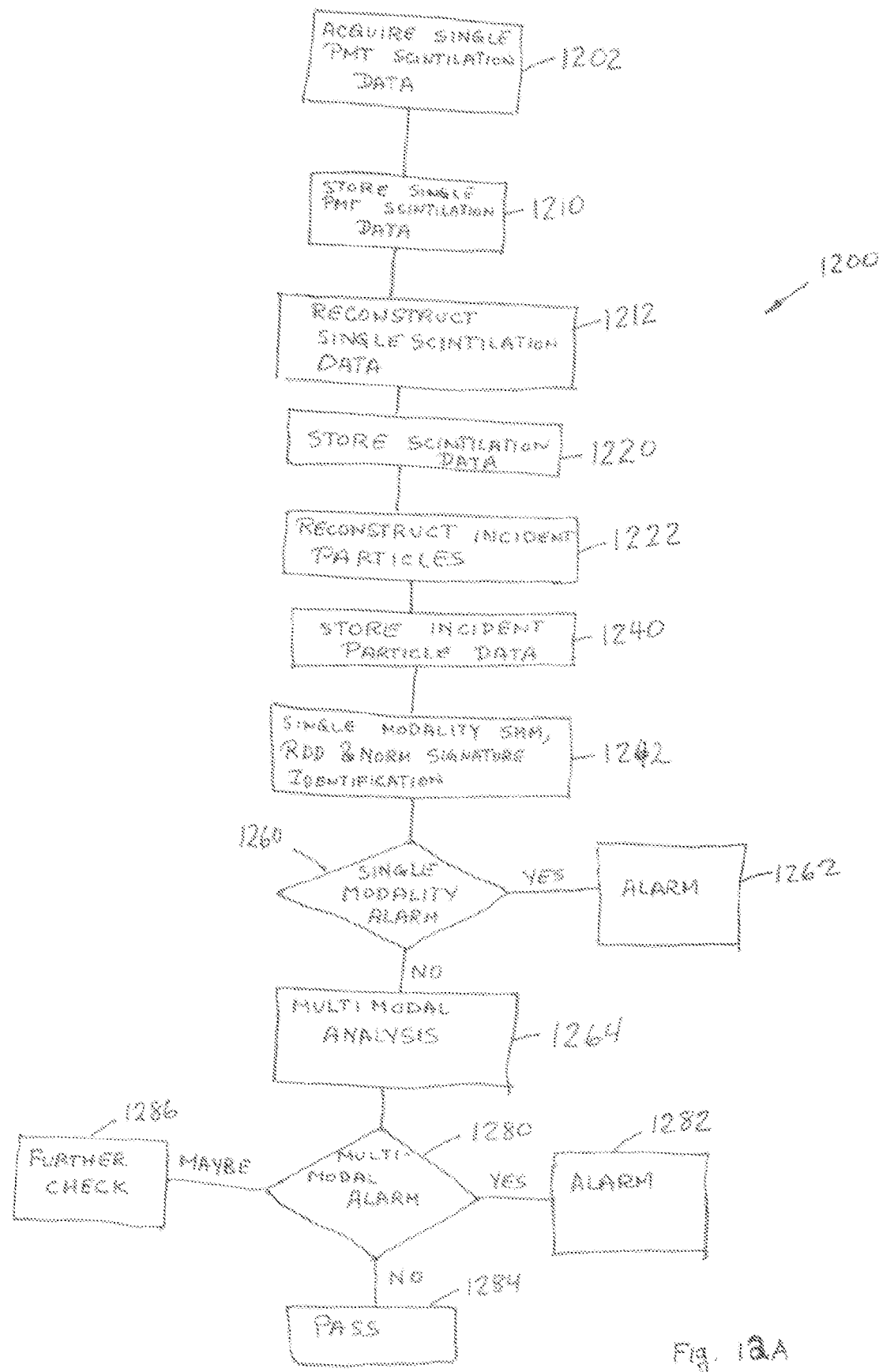
FIGS. 12A-12E are simplified flow charts illustrating the methodology used to determine threats and their type, in accordance with an embodiment of the invention.
Figure 12B:
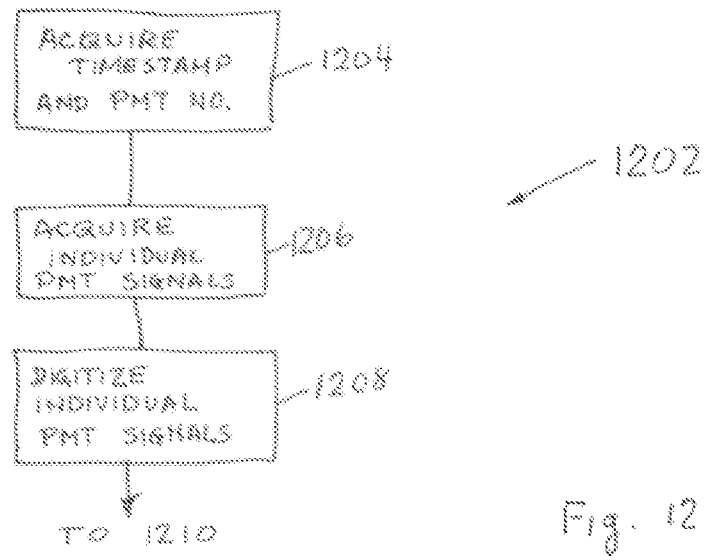
Figure 12C:
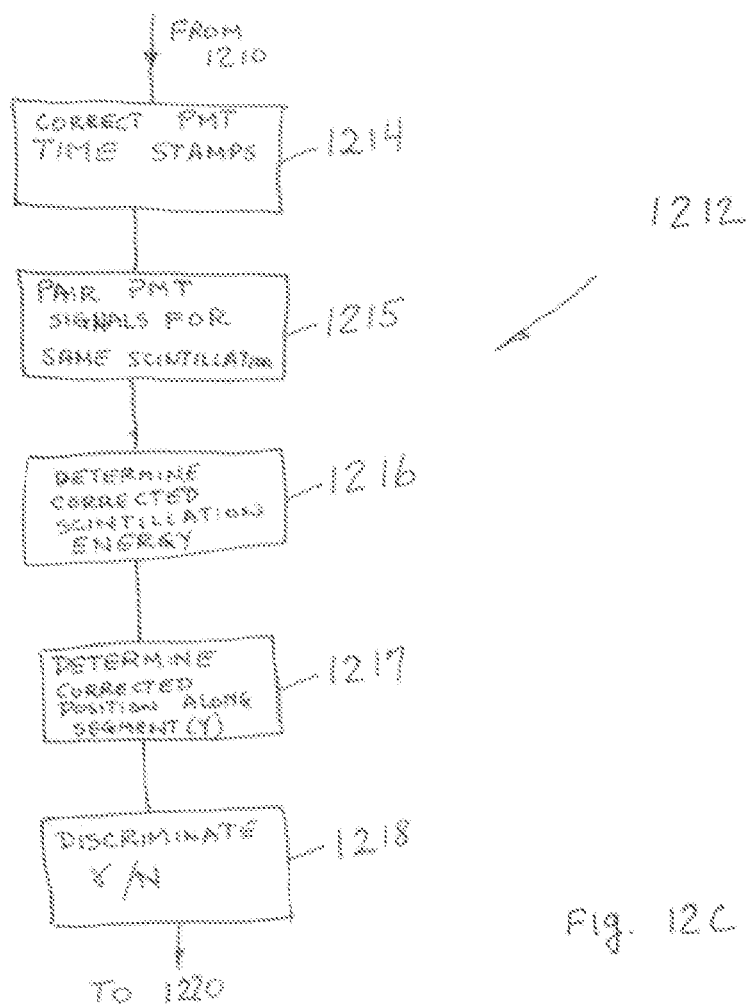
Figure 12D:
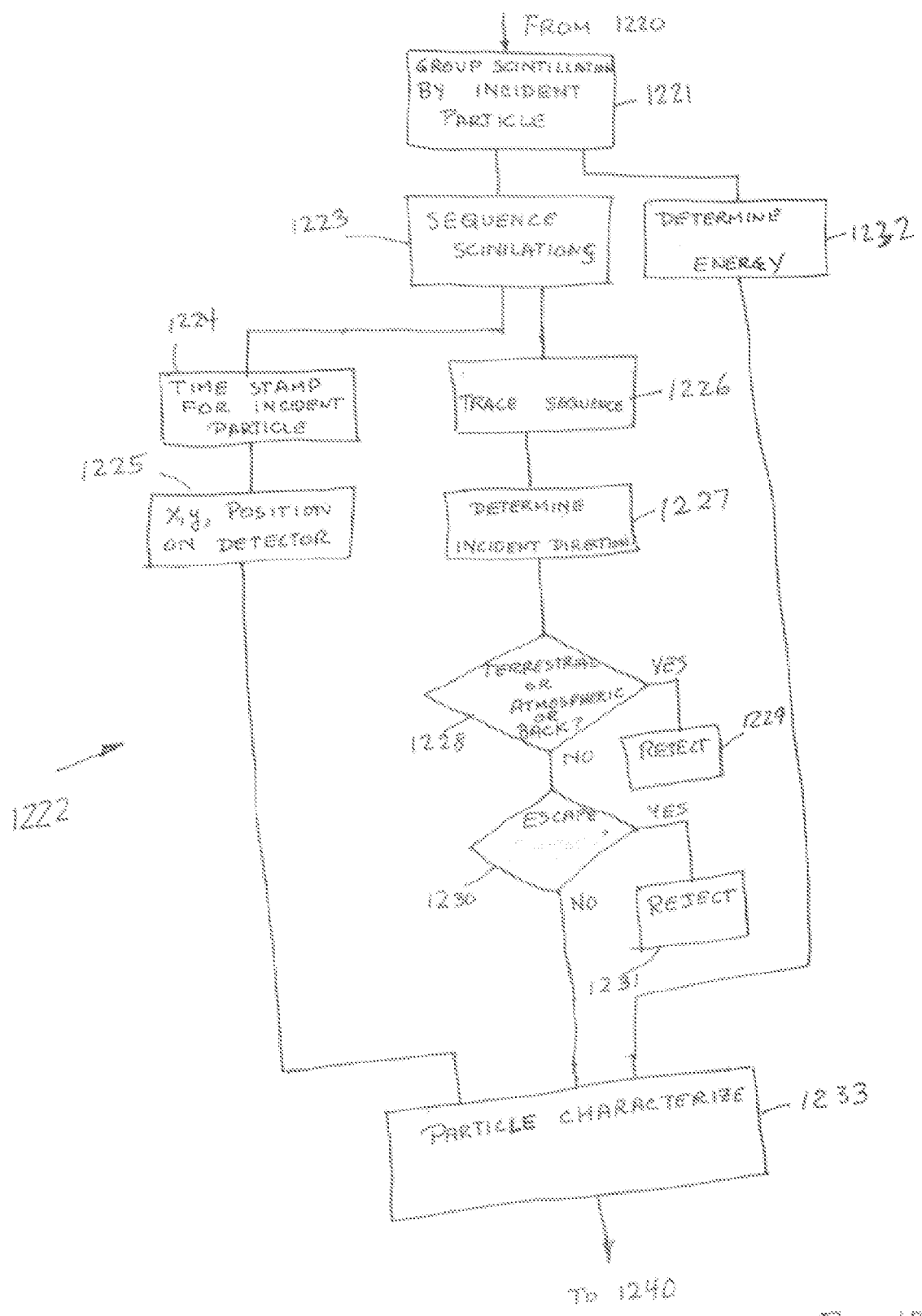
Figure 12:
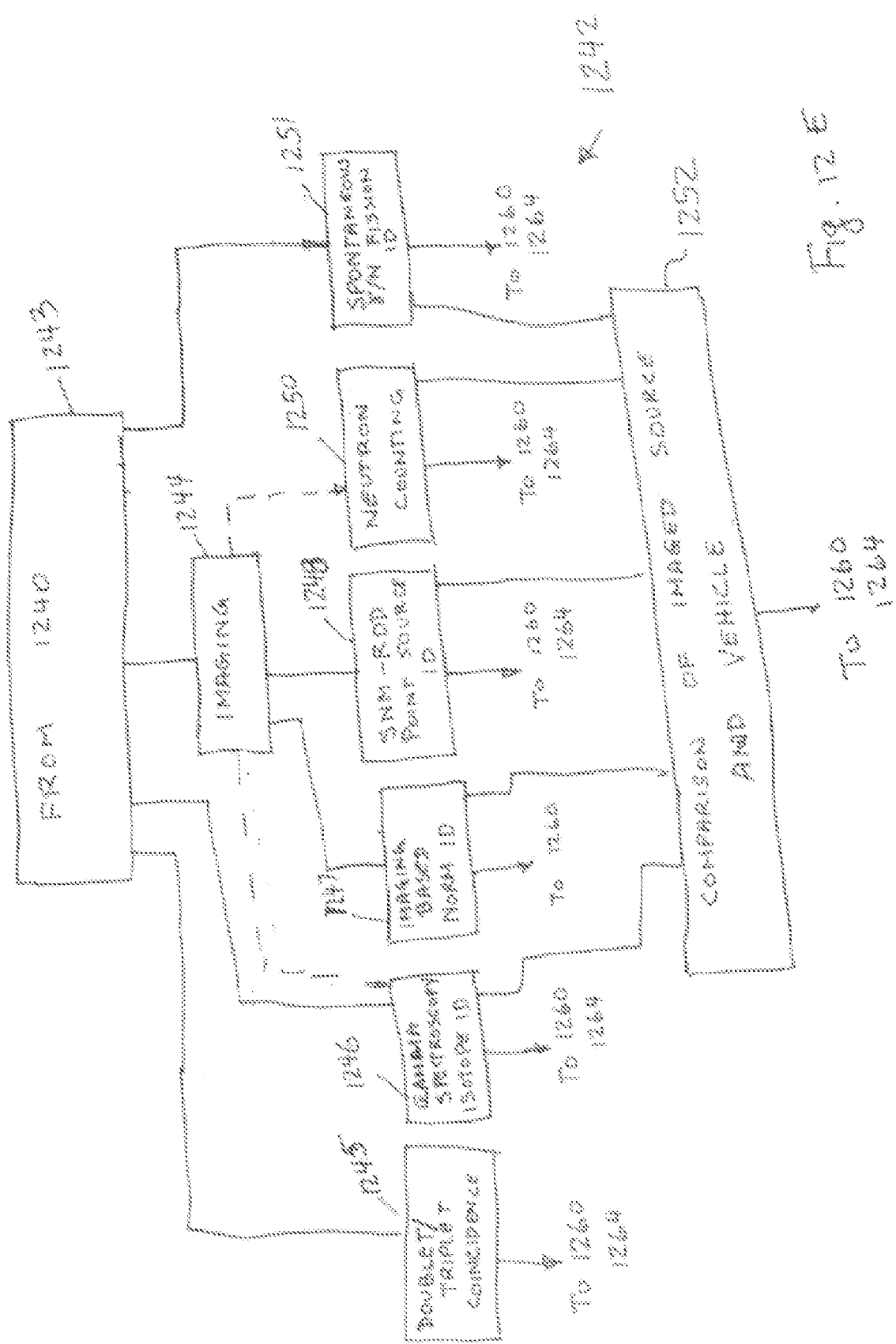

This measurement is repeated for all of the segments and used to provide a look-up table of corrections which enable the conversion of pairs of time-stamped light signals into energy signals and position values, which are used in the method described in FIG. 12.

Alternatively, the energy collection efficiency can be assumed to be the same for all the segments. Similarly, the collection efficiency as a function of position along the segment can also be assumed to be the same for all segments. Thus, measurements of energy signal correction factors can be approximated for all of the segments, by measurements on a single segment. Such approximation can be expected to give poorer spectral results than when energy correction is based on individual measurements of each detector.

Alternatively, the absolute energy sensitivity of the individual segments is measured, and the spatial distribution is assumed to be the same for all segments. In order to do this, an energy measurement, as described above is performed, but only for a single point along the length of the segment. The sum of the values of the signals is compared to a standard and the energy efficiency of collection is determined by the ratio of the signals. Optionally, the standard is based on measurements of a number of segments. It is noted that this alternative also gives a time difference between the detectors on both ends of the segment.

However, neither this nor the other alternative methods of energy signal calibration allow for determination of an absolute time delay, which is used for some embodiments of the invention.

Absolute time delay (and a correction for such delay variations) for each PMT channel can be determined by feeding a light signal that simulates a scintillation into the segment and then measuring the time delays of the signals outputted by each of the two PMTs at the ends of the segment. If the signal is fed into center of the segment for all of the segments, the time delays of all of the PMTs channels for all the segments can be determined so that a comparison of the times of the signals from each PMT can be used to provide a consistent time stamp for each scintillation event.

It is noted that the segments partitions are coated by a light reflecting material. In order to feed light into the segment, a very small portion of the segment is left uncoated at the center of the segment. Optionally, an LED is embedded in the segment wall and the delay testing is performed on the segments in the assembled detector. These measurements can be performed periodically to partially compensate for instability or drift of the PMTs.

Optionally, alternatively or additionally, the PMTs and their associated circuitry are calibrated before assembly by feeding a light impulse of a standard intensity and timing into the PMT. The output of the circuitry is then measured and the gain and delay is noted and used to determine a correction factor for both energy measurement and timing. Optionally, the circuitry is adjusted to change the gain and time delay such that the outputs of all the PMTs have the same integrated signal output and timestamps.

Optionally, the PMTs can be removed from the rest of the segments so that they can be replaced, or adjusted when they go out of the calibration range.

If the segments are not separable (e.g., they are in a bath) other methods can be used to determine energy and time delay corrections. In this case a collimated beam of high energy gammas (e.g., 1.4 MeV of K-40) is introduced perpendicular to the face of the detector. This beam has a substantial half length in the LS, before the first interaction and some of the interactions will be photoelectric interactions. The energy of these interactions is known and the difference in signals produced in the various segments (also as a function of position along the segments) is used to calibrate for energy. It can also be used to calibrate for position determination using signal strength, using the ratio of signals when the beam is at the center of the section as a standard correction for the ratios produced during detection of threats. This measurement can also define a relative difference in delay between the two end PMTs which can be used to determine the γ position correction. As to absolute timing, this can be determined to a reasonable accuracy by the use of LEDs situated near each of the PMTs.

Figure 6:
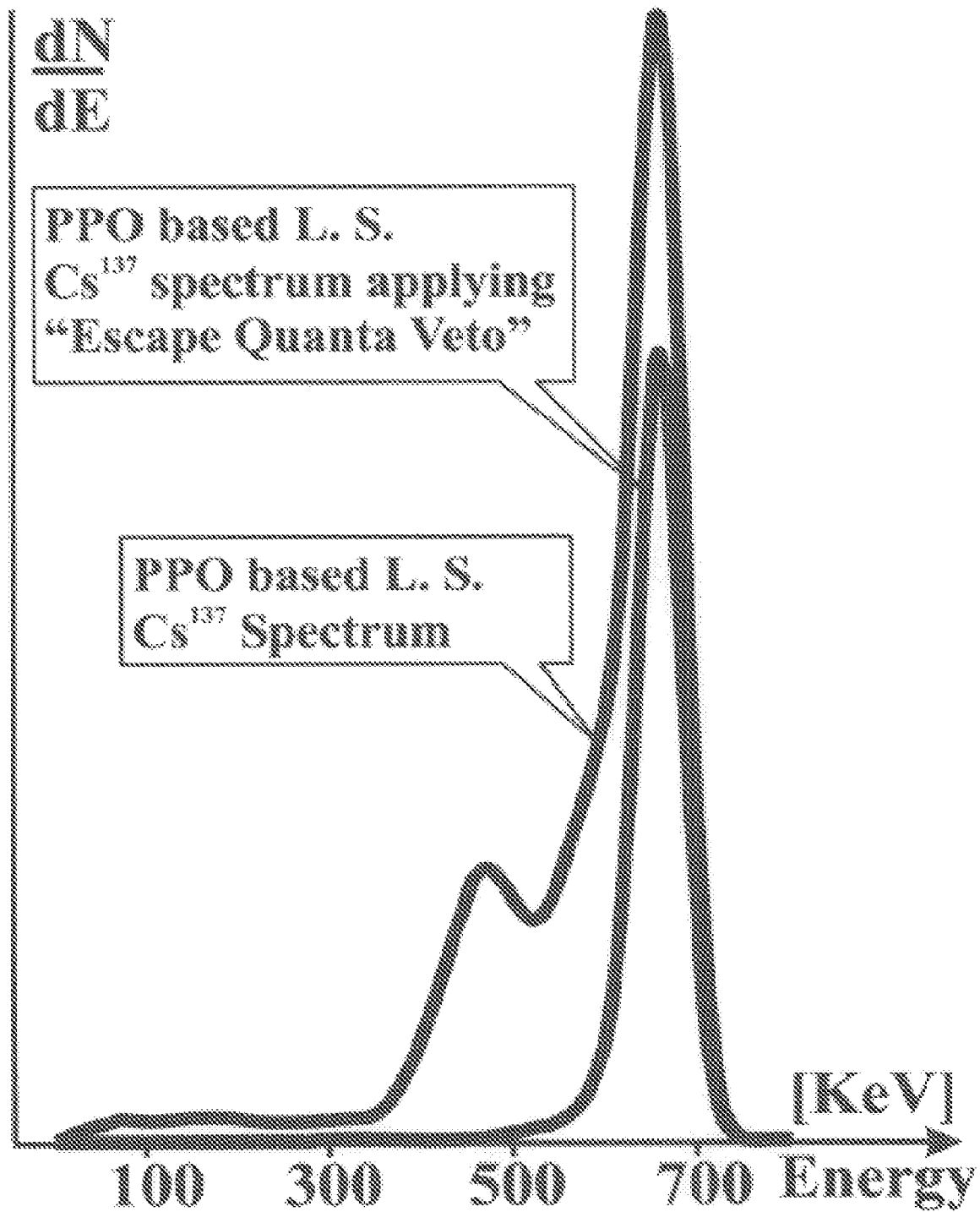
FIG. 6 shows Cs-137 energy spectrum comparisons between a PPO based LS detector without escape quanta veto and with escape quanta veto.
Figure 7:
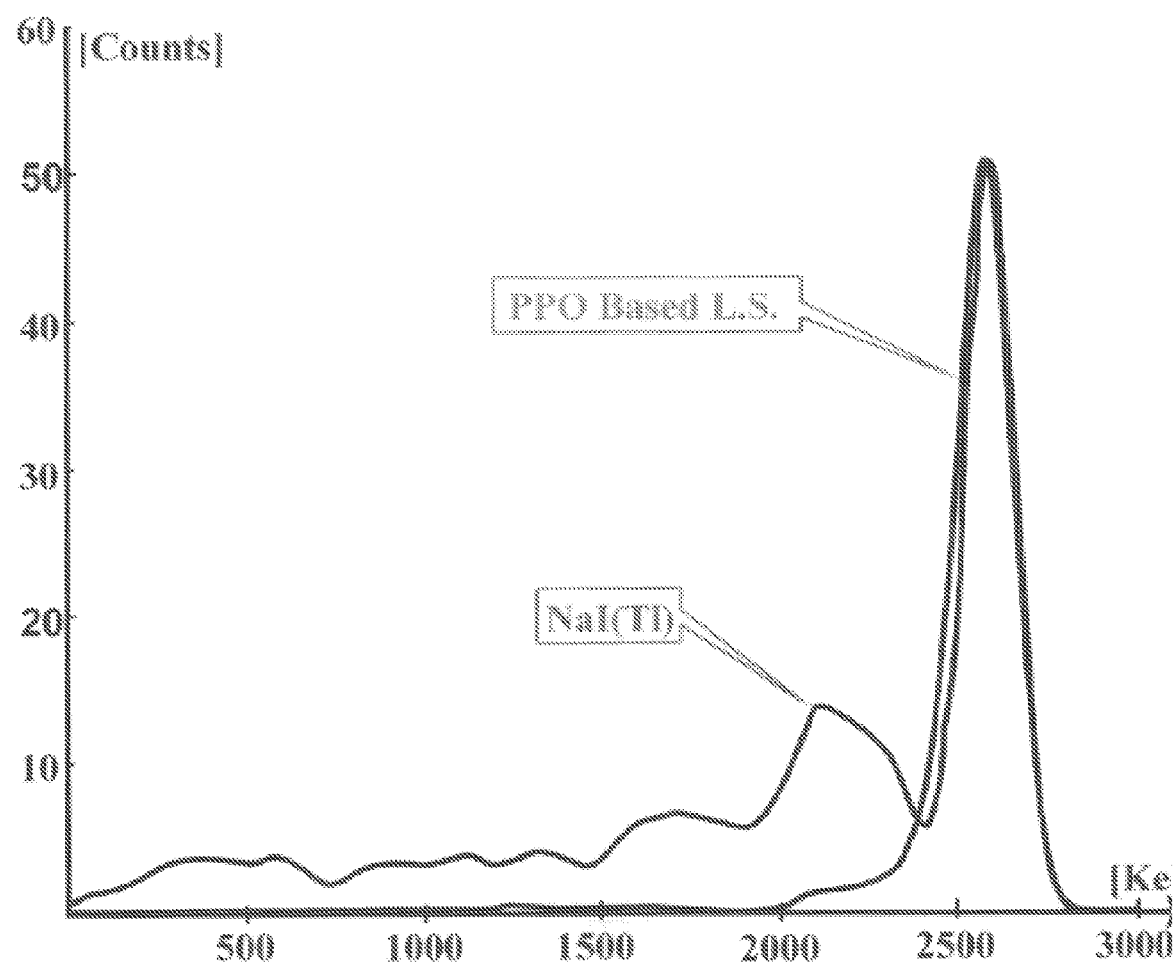
FIG. 7 shows U-232 (daughter) 2.6 MeV energy spectrum comparisons between a NaI(Tl) based detector and a PPO based LS detector according to an embodiment of the invention.

An additional source of reduction in gamma spectroscopic isotope ID quality is caused by energy that is lost when a residual gamma or electron escapes from the detector. While this phenomenon is well known, correcting for it is difficult, since it can not be determined on an individual basis if such escape occurred and also how much energy escaped. The result will be that the spectrum of an monoenergetic gamma source will have a lower energy pedestal as seen in FIGS. 6 and 7. It has been found that in general most incoming gamma rays of a given energy have a certain range of number of scintillations before they give up all their energy. If events that have below this number of scintillation are rejected, then the spectrum is substantially improved, at the expense of some loss of events. This phenomenon is shown graphically in FIG. 6. FIG. 6 shows the results of two Monte Carlo. simulations. One without and one with escape quanta veto. The first simulation (represented by the upper spectrum) is a straight forward single energy gamma spectrum. Note that the escape quanta result in a lower energy pedestal on the left side of the peak. This phenomenon impairs the detectability of lower energy peaks. The same simulation was repeated. This time the total number of scintillations was counted for each incident gamma particle. Individual incident gammas which resulted in less than a threshold number of scintillations have been rejected (vetoed). Note the disappearance of a low energy pedestal in the second simulation and the reduction of peak sensitivity.

FIG. 7 shows normalized 2.6 Mev gamma energy spectrum comparisons between an NaI(Tl) detector and a detector of the type described above.

Figure 8:
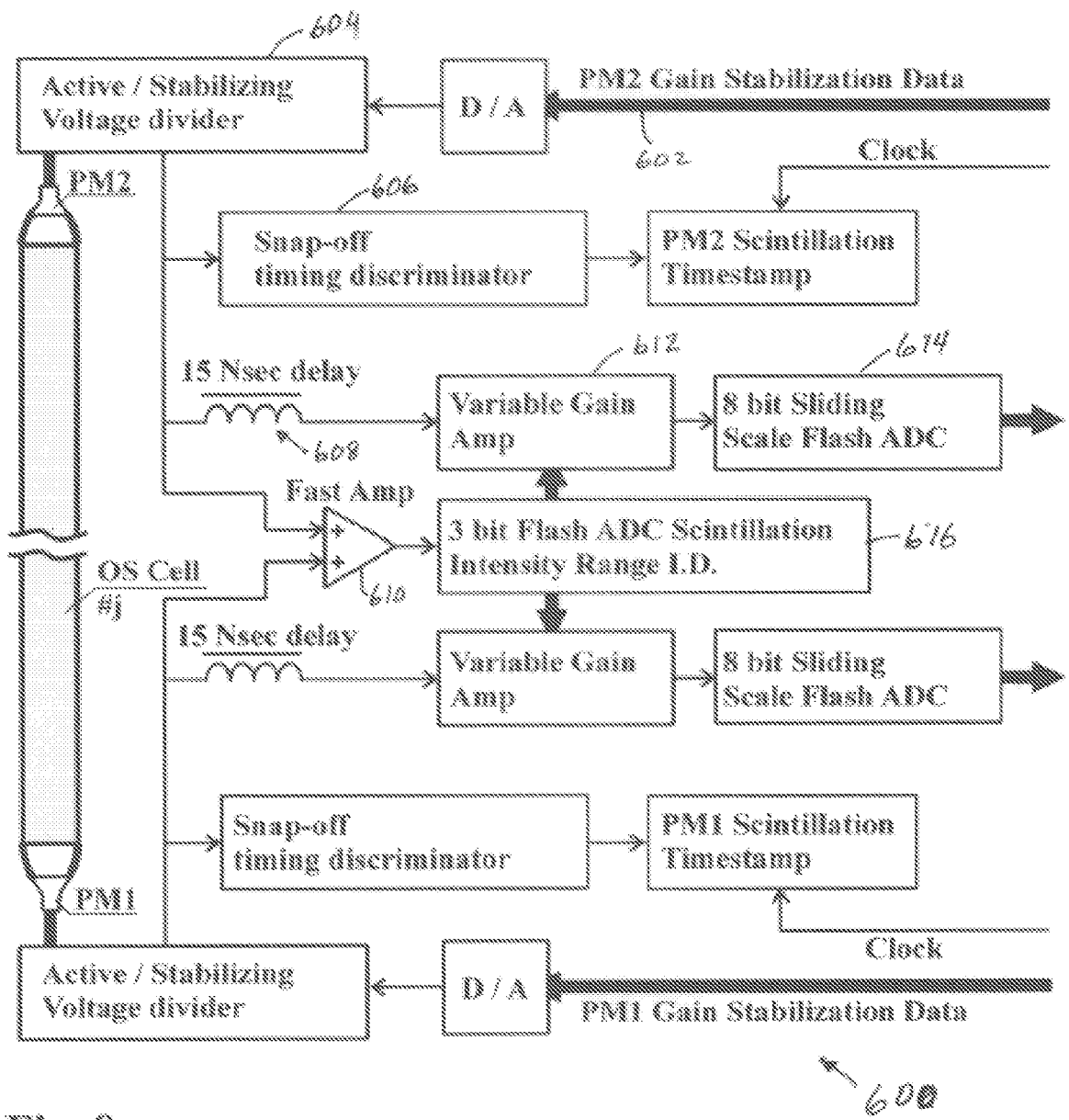
FIG. 8 is a schematic block diagram of exemplary front-end electronics, for use with each elongate segment of FIGS. 4A and 4B.

FIG. 8 is a schematic block diagram of exemplary front end electronics 600, for use with each elongate segments of FIGS. 4A and 4B. It is noted that the circuitry is symmetrical about the center of the center of the drawing. Only the upper half of the drawing is discussed.

The upper signal line represents circuitry 602 for gain stabilization PMT voltage division and outputting 604 of signals from the upper PMT anode (PM2). This signal is fed to a snap-off timing discriminator 606 and a delay circuit or delay line 608, typically 15 nsec long. It is also fed to an adder 610. The snap-off timing discriminator and timestamp circuitry are used to provide a timestamp representing the time of the leading edge of the signal. This value is saved to be used in the analysis described below with respect to FIG. 12. The signals fed to the fast amplifier by the PMTs are added to provide a crude energy signal for the scintillation. The amplitude of this gives a rough measure of the amplitude of the signals in a scintillation range ID circuit, 616. This measure is used to set a variable gain amplifier 612 with an appropriate gain, before the signal from the PMT has passed delay circuit 608. An 8 bit flash ADC (614) is used to digitize the signal, preferably with a sampling rate of 1-2 nsec. The digitized signal (and its companion from the other PMT) is stored together with the time stamp. Thus for each PMT, an uncorrected intensity and timestamp are stored. The use of these stored values is described in conjunction with FIG. 12. The circuits shown between the upper and lower lines could be replaced by a pair of 14 bit flash ADCs. However, the circuit shown is substantially less expensive.

Figure 9:
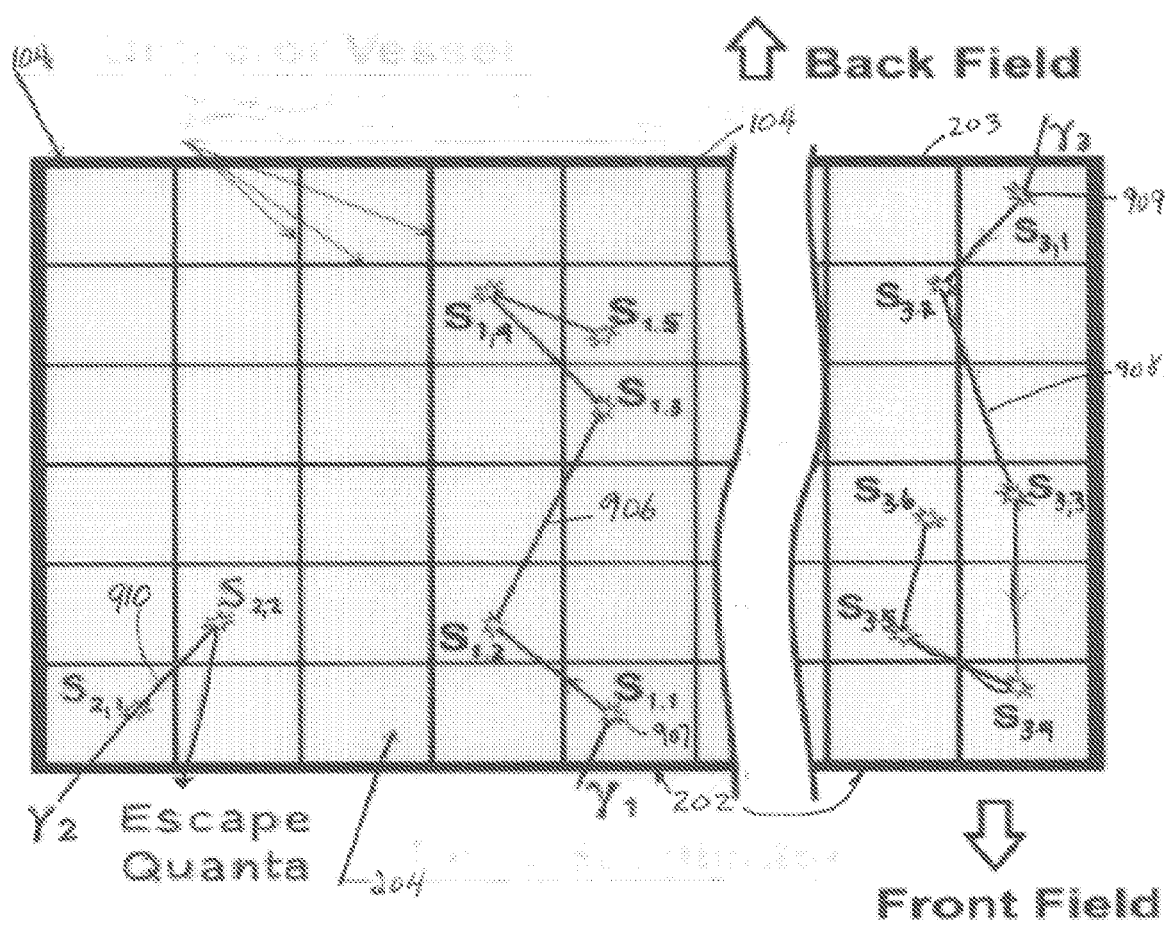
FIG. 9 illustrates various interactions of incident gammas with the segmented detector and a methodology for rejection of events which do not come through the front face.

FIG. 9 illustrates a methodology for rejection of events which do not come through the front face of the detector, or alternatively for identifying and separating between the events that come through the front or rear faces. As was indicated above, it is possible to determine a statistically probable direction of incidence of a gamma ray. FIG. 9 further illustrates this method. Detector 104, having a front face 202 and a back face 203 is shown with tracks 906, 908, 910 of scintillations caused by three incident gamma rays.

While the probable direction of incidence of gammas associated with tracks 906 and 908 can only be estimated statistically, it is practically certain that the gamma ray that resulted in track 906 is incident from the front of the detector and that associated with track 908 is incident from the back of the detector. This is true for two reasons. First, the initial scintillation 907 of track 906 is nearer the front than the back face and the initial scintillation 909 of track 908 is nearer the back face. This provides a certain probability (depending on the mean free path of the gamma ray and the thickness of the detector) that the track resulting in 906 is caused by an incident ray passing through the front and the track resulting in 908 is caused by a ray passing through the back face. Thus, the sequence of scintillations or each track provides an indication of rear or front entry of the event.

In addition, the direction determined from the initial path of the track shows a high probability of incidence from the front for track 906 and from the back for 908.

In embodiment of the invention, one or both of these factors (nearness and probable direction) are utilized to separate between gamma rays that enter from the front and those that enter from the back.

Track 910 corresponds to a gamma ray that has a much lower number of scintillations than normal. This is preferably classified as an event that for which not all the energy is captured. Such scintillations are preferably ignored.

Figure 10:
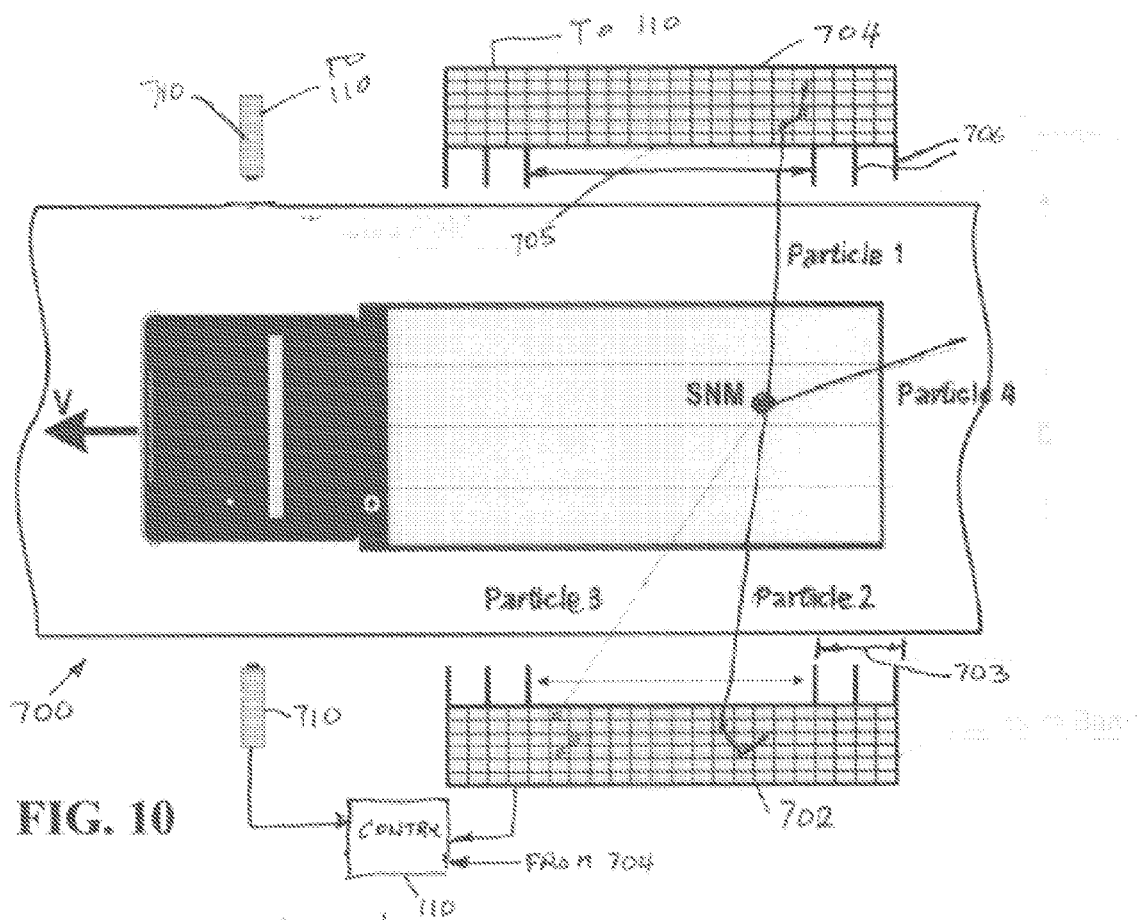
FIG. 10 is a schematic illustration of a detection portal according to an embodiment of the invention in which a partially collimated detector is used.

FIG. 10 is a schematic illustration of a detection station 700 according to an embodiment of the invention in which a pair of partially collimated detectors 702, 704 is used. As was indicated above, it is not possible, based on the detected scintillations alone, to accurately determine the direction of incidence of gammas, let alone neutrons, except for determining the detector side in which neutrons interacted.

Detectors 702 and 704 have a portion 703 of the detector that is collimated by High Z collimator plates 706 and a portion 705 that has no collimators. In an embodiment of the invention the collimated portion is used for detection and imaging of gammas and the uncollimated portion is used for detection of gammas. The entire detector is used for the detection of neutrons, without imaging.

Also shown on FIG. 10 is a pair of CCTV cameras 710. These cameras are one example of how the velocity and position of the vehicle is determined and allow for the construction of a composite image based on scintillations detected over the entire time that the vehicle travels between the detectors in a coordinate system that moves with the vehicle. In addition, by correlating the detected gamma and neutron images determined from the detectors with the optical images from a CCTV camera or cameras, the position of the suspected threat within the vehicle can be estimated and used to better acess the probability of threat. As described in U.S. patent application Ser. No. 11/348,040, this can improve the system ROC.

Figure 11:
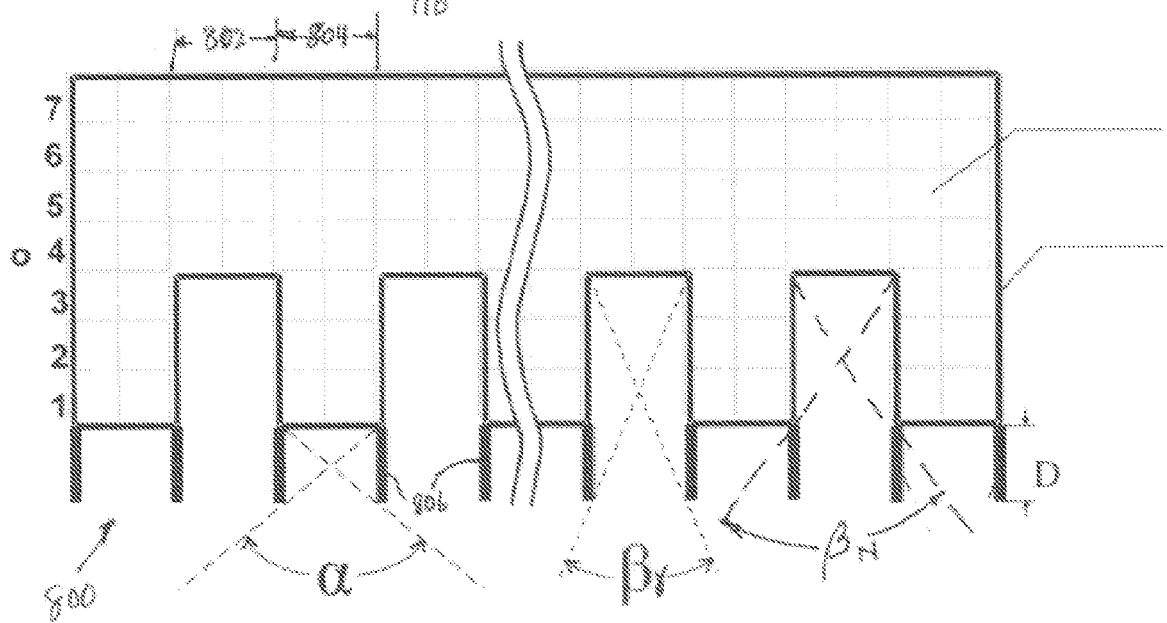
FIG. 11 illustrates an alternate detector, in which collimation is provided, in accordance with embodiments of the invention.

FIG. 11 illustrates an alternative detector 800, in which collimation is provided, in accordance with embodiments of the invention.

Detector 800 is characterized by having a different depth over different portions of the detector. This detector is meant to provide a trade-off between sensitivity and spatial resolution as well as between spatial and energy resolution. This corresponds to a trade-off between image based threat detection quality and other signatures detection quality.

Consider first section 802, which has less depth. However, the front face of this section is bounded by adjoining sections 804. Sections 804 act as collimators for section 802, since they absorb gamma rays and neutrons that do not arrive via angle $\beta_N$. Thus, for sections 802, the direction of captured neutrons in the direction shown is limited. For gammas the angle is smaller, and is reduced by optional collimator plates 806 to an angle $\beta_\gamma$. Furthermore, collimators plates can be placed inside the cavities in the detector, parallel to the plane of the drawing. This will similarly limit the angle in the other direction for the gammas. Optionally, neutron absorbing OS material can be used instead of high z collimators to provide a measure of collimation in the other direction for neutrons.

Now consider the second section 804; this section will have a lesser directivity α for gammas (and only gross directivity for neutrons), but, since the detector is deeper at this point, will have generally better energy selectivity for gamma rays. This is based on the expectation that more of the energy will be captured by making the detector thicker. $\alpha$, $\beta_\gamma$ and $\beta_N$ are typically of the order of 4, 1.2 and 2 meters, FWHM at a distance of two meters. It is understood that these values are a balance between image spatial resolution, particle capture efficiency and to a lesser degree, spectral selectivity (based mainly on a reduction of capture efficiency).

FIGS. 12A-12E are simplified flow charts illustrating the methodology used to determine threats and their type, in accordance with an embodiment of the invention.

FIG. 12A is an overall, simplified flow chart of a method 1200. In the illustrated method, a plurality of signals from each PMT 212 is acquired, for example, using the circuitry of FIG. 8. This acquisition is explained more fully below with reference to FIG. 12B. The individual PMT data is stored (1210) and signals are corrected and paired (1212) to reconstruct the characteristics of each scintillation event. This process is described more fully with respect to FIG. 12C. Data for each scintillation is stored (1220).

The stored data is grouped by incident particles which are reconstructed and individually analyzed (1222). This process is described more fully with the aid of FIG. 12D. The individual particle data is then stored (1240).

The incident particle data is analyzed to determine one or more "signatures" (1242) characteristic of SNM, RDD and NORM and/or their isotopes. This is discussed more fully with respect to FIG. 12E.

Based on the individual signatures, a determination is as to whether a threat is present (1260). If a threat is identified with a high probability (e.g. >5σ), then an alarm is generated (1262). If multimodal analysis is available, then such analysis (1264), as described further below, is performed. If it is not available, then 1260, 1262 are replaced by 1280, 1282, 1284 and 1286, described immediately below. It should be noted that if multi-modal analysis is available, then it is usually performed before any alarm is sounded to verify the single modality determination and to reduce false alarms.

After multi-modal analysis, (and more preferably a plurality of multi-mode analyses) a threat assessment (1280) is performed. If the multi-modal threat probability is above a certain threshold, then an alarm is generated (1282), If it is below a second, lower threshold, then the vehicle/object being tested is cleared (1284). If it is between the two thresholds, then the vehicle/package is sent for further manual or machine testing (1286).

Returning to 1202, reference is made to FIG. 12B, which is a simplified flow chart of the processes of single PMT signal acquisition. At 1204 the signal is identified as a signal and given a time stamp. The signal is acquired (1206) and digitized (1208). In an embodiment of the invention, the circuitry of FIG. 8 is used to acquire the signals.

Returning to 1212, reference is made to FIG. 12C, which is a simplified block diagram of the process of reconstructing the characteristics of individual scintillations from the separate signals of the PMTs. The data in the PMT raw database is corrected in accordance with the correction factors described above. The time stamp is corrected (1214) for each scintillation, according to the time delay correction described above. Then, the PMT signals are paired (1215) and associated with a given detector based on the time stamp (i.e., the signals have a time stamp within the maximum corrected time for signals from PMTs of the same segment). The energy signal (sum of the energy deposited signals indicated by each PMT) of the signals preferably corrected by the loci dependent light correction efficiency correction described above is determined (1216) and identified as the energy signal of the scintillation. The position of the scintillation, along the length of the segment is determined (1217) based on the one or both of the energy difference between the paired PMT signals or the difference between their corrected time stamps (difference between TOFs). In addition, the determination of whether the scintillation is caused by an interaction with a γ or a neutron, is optionally determined (1218) by the decay time constants or shape difference of the signals. It is well known in the art that in OS, the neutron caused scintillation decay is substantially longer than that caused by a gamma. The information on the scintillations is sent for storage (1220, FIG. 12A) in a scintillation database.

Returning to 1222, FIG. 12D is a simplified block diagram of the process of single incident particle analysis and reconstruction.

First, the scintillations are grouped (1221) in accordance with their time stamps as scintillations that are generated by a single incident gamma or neutron. In practice, all scintillations that occur with a window of −10 nsec and +20 nsec of the "first" scintillation are considered as part of the same group, so long as they are geometrically close (e.g., closer than 1 meter apart). Since the time between incident particles is much larger than the time between scintillations, there is only a small chance of overlap of scintillations from different incident particles. In the event that there is such overlap, this in itself could be indicative of a cascaded event, spontaneous fission salvo or an RDD or of a very large unshielded source.

Once the scintillations have been grouped, the total energy (1232) transferred from the incoming event can be determined by summing the individual energy signals of the scintillations in the group.

Separately from the energy determination, the scintillations are sequenced (1223) based on their corrected time stamps. A time stamp for the incident radiation is determined as the first of the sequence of scintillations (1224) and its position of incidence is determined (1225) from the position along the segment as described above (for γ) and by the segment in which it appears (x,z).

The sequence is optionally traced (1226) through the detector to determine its path. This path is optionally used to determine (1227) a gross direction of incidence. Depending on the energy, this gross direction can be used for rejecting (1228, 1229) events that are from terrestrial or sky sources and those that enter the detector from the sides other than the front face. For higher energy gamma, for which the scatter is relatively low, the gross direction becomes sharper and may be useful for imaging as well. Alternatively or additionally where collimation is available, a direction of incidence can be derived for one or both of gammas and neutrons, depending on the type and configuration of the collimation as described above.

Furthermore, using the principles described above, with respect to FIG. 9, some of the events can be classified as having escape quanta (1230) and rejected (1231). The particle is then characterized (1233) by (1) its time of incidence; (2) its x, y incident coordinates; (3) its direction of incidence, if available; (4) whether it is a neutron or an gamma; and (5) its energy (if a gamma). This information is sent to 1240 for storage.

Returning to 1240, FIG. 12E is a simplified block diagram of actions performed in single modality threat detection. It is noted that different detector configurations are generally needed for optimizing these single modalities. For example, if collimation is used, the event capture efficiency is reduced and the gamma spectroscopy and coincidence (doublet, triplet and γ/N coincidence) signature detection are degraded. On the other hand, when collimation is used the ability to determine where the threat is in the vehicle and whether it is a small source (and thus more probably an SNM or RDD) is enhanced. Thus, it may be useful to have more than one detector each with different capabilities. A second detector can be used to screen all of the vehicles/packages or only those that look suspicious when they pass the first detector.

First, information on reconstructed events that are stored is retrieved (1243). To the extent possible (depending on the detector capabilities) related events (for example gammas with a same energy or neutrons) are optionally imaged (1244).

Using the information that is stored in 1240 the following signature/analyses are possible: doublet/triplet coincidence (1245); gamma spectroscopy isotope ID (with or without imaging and on the entire detector or vehicle or only in the area of a possible threat) (1246); image based NORM ID to identify the NORM signature (1247); SNM-RDD "point" source ID (based on the understanding that threats are generally less than 0.5 meters in extent) (1248); neutron counting/imaging (1250); and spontaneous fission γ/N ID, based on the temporal coincidence of a gamma and/or neutron events (1251). When a modality produces an image, then this image can be superimposed on an optical image of the vehicle (1252). All of the generated analyses are sent to a single modality alarm (1260) which compares the level of the individual threats probability and determines if an alarm should be generated based on only a singe threat.

Appropriate ones of these single modality analyses are subject to multi-modal analysis 1264. It is well known in the art of statistics (and in particular in threat analysis) that probability of detection false alarm or overlooked threat rates can be significantly reduced when information from orthogonal sources (or semi-orthogonal sources) are available. Any of the techniques available in the art would appear to be suitable for the present multi-modal analysis. Some of the multimodal analyses include:
  image guided gamma spectroscopic SNM-RDD ID;
  combined Neutron counting and gamma spectroscopy ID;
  doublet detection and Gamma Spectroscopy SNM-RDD-NORM ID;
  doublet detection and imaging SNM-RDD-NORM ID; and
  fused nuclear and gamma imaging.

Figure 13:
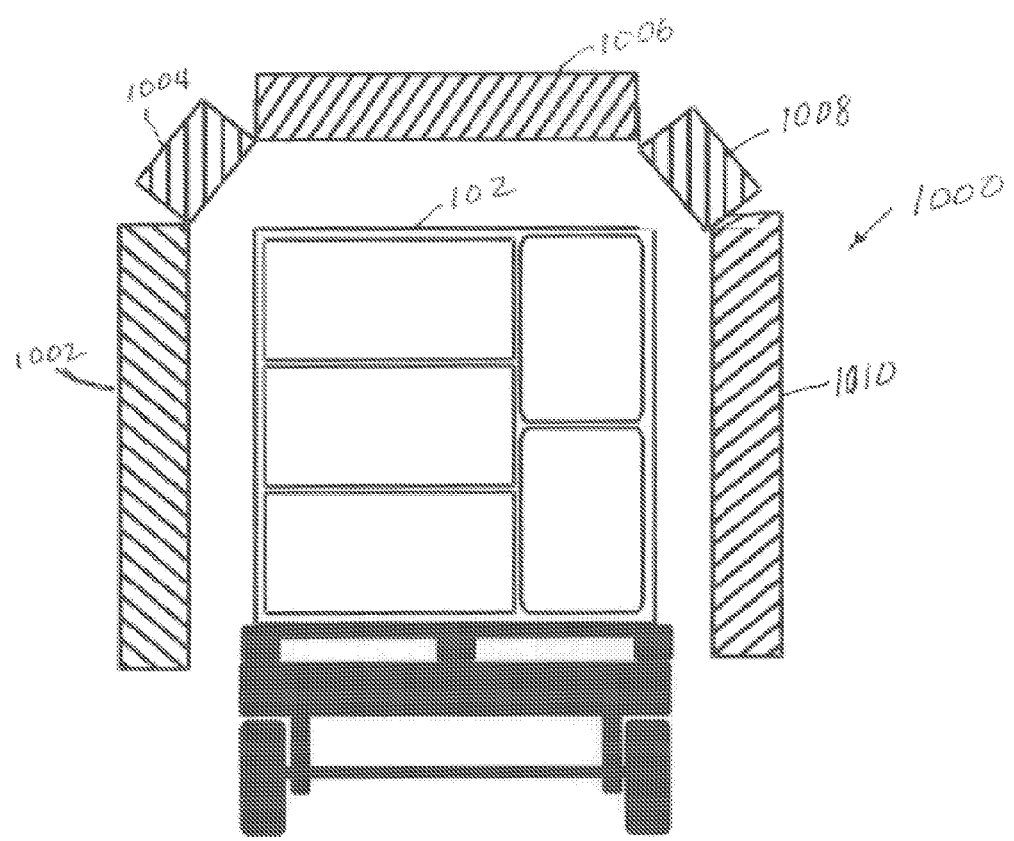
FIG. 13 shows a system in which additional detectors are used to improve capture efficiency and provide an option for transaxial tomography.

FIG. 13 shows a system 1000, in which additional detectors are used to improve capture efficiency. In system 1000, five detectors 1002, 1004, 1006, 1008 and 1010 are used.

As can be seen the additional detectors increase the solid angle subtended by the source. Alternatively to providing five detectors, three detectors (detectors 104 and 108 are omitted and the other detectors are extended to close the gap); four detectors (one detector on each side, one above and one below the vehicle); or eight detectors (an arrangement of three detectors beneath the vehicle similar to that shown in FIG. 14 above the vehicle), may be provided. Other variations of placement will be apparent to the person of skill in the art. These detectors can provide axial tomography and/or linear tomography to better detect threat "point" sources.

Figure 14:
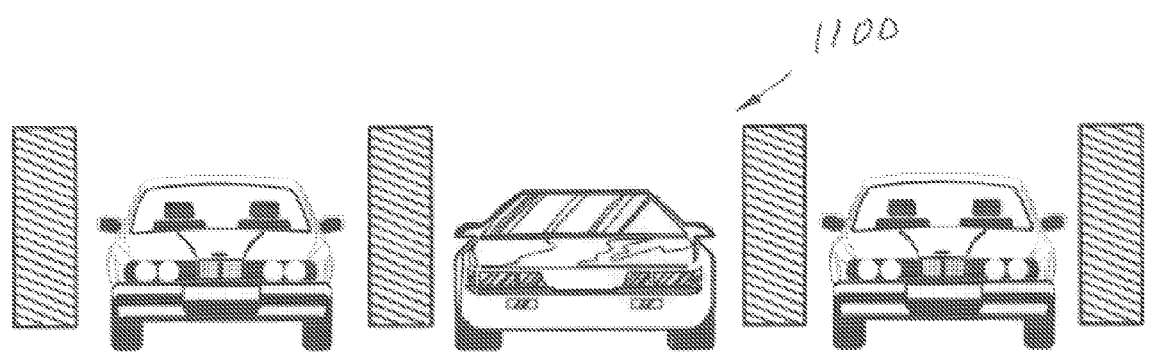
FIG. 14 shows a multi-lane system in which a same detector is used for adjoining lanes.

FIG. 14, shows a multi-lane system 1100, in which a same detector is used for adjoining lanes. As indicated above, one detector is needed between two lanes, since the detector can discriminate between incident events which come from different directions. Thus, only N+1 detectors are required for a multi-lane checkpoint portal having N lanes.

It should be noted that while the invention is described herein as using at least two detectors, in some embodiments of the invention, a single detector can be used, with reduced sensitivity/efficiency. Alternatively, more than two detectors can be placed around the path of the vehicle, such as top, bottom and two sides. Such detectors can not only improve SNM-RDD detection sensitivity but can also shield against environmental and foreign background radiation, resulting in further improved ROC.

While the preferred OS is a liquid OS, in some embodiments of the invention a plastic OS, such as PVT can be used.

Although the detectors are described in the context of passive detection of nuclear threats, in some embodiments of the invention, the large detector is used as a gamma and/or neutron detector of active portals.

Although the detectors are described in the context of threat detection of SNM-RDD devices and radioactive materials carried on vehicles, in some embodiments the large OS detectors are used to screen supply chain articles (e.g. containers, pallets, air cargo, mail bags, etc.)

While described explicitly, corrections known in the art, such as background correction, can be applied in portals using detectors of the present invention.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A detector for detecting nuclear radiation threats, the detector comprising:
    a plurality of elongate scintillator segments arranged in a side by side array;
    at least one pair of light sensors optically coupled to ends of each of the elongate scintillator segments such that they receive light from scintillations produced in the scintillator segments and generate electrical signals responsive thereto; and
    a controller that identifies a plurality of scintillations as emanating from a single incident particle based on a time window within which they fall and their spatial proximity within the detector.

2. A detector according to claim 1 wherein the segments are separated by partitions that are substantially transparent to gamma radiation and are reflectors for light.

3. A detector according to claim 2 wherein the segments are contiguous, separated only by said partitions.

4. A detector according to claim 2 wherein the scintillator segments are at least partly non-contiguous.

5. A detector according to claim 1 wherein the segments have a rectangular cross-section perpendicular to the elongate direction.

6. A detector according to claim 1 wherein the segments have a circular cross-section perpendicular to the elongate direction.

7. A detector according to claim 1 wherein the scintillator segments comprise an organic scintillator.

8. A detector according to claim 7 wherein the organic scintillator is a liquid organic scintillator.

9. A detector according to claim 8 wherein the light sensors have input face plates and wherein the faceplates are in direct contact with the liquid organic scintillator.

10. A detector according to claim 1 wherein the controller generates an image of the sources of radiation that cause the scintillations.

11. A detector according to claim 1, wherein the scintillator produces scintillations responsive to incoming neutrons, and the controller receives the electrical signals and determines the positions of the incident neutrons on the detector.

12. A detector according to claim 1, wherein the scintillator produces scintillations responsive to incoming neutrons, and the controller that receives the electrical signals and generates an image of the sources of neutron radiation that cause the scintillations.

13. A detector according to claim 7:
    wherein the controller receives the electrical signals, and produces an energy value, the energy value being responsive to the electrical signals, wherein the energy value is corrected based on the location of the scintillation within the scintillator segment.

14. A detector according to claim 7 and comprising:
    a plurality of collimators on a front face of the organic scintillator that block radiation that would be detected by the said detector from parts of the radiation field.

15. A detector according to claim 14 wherein the plurality of collimators restrict radiation over only a portion of the front face.

16. A detector according to claim 7 wherein the plurality of elongate scintillators form a detector having a front face having a total area greater than 1 meter by 1 meter.

17. A detector according to claim 8 for detecting nuclear threats that generate one of both of neutrons and gammas, wherein the light sensors receive light of scintillations in the liquid organic scintillator caused by gammas and neutrons;
    wherein the controller receives the electrical signals and generates both a count of the incident neutrons and a spectroscopic energy analysis of the gammas.

18. A detector according to claim 1 wherein the plurality of elongate scintillators form a detector having a front face and a back face and wherein the scintillators produce scintillations in response to radiation that enters the detector via the front face and the back, and the controller receives the electrical signals, and discriminates between the radiation entering the front and rear faces.

19. A detector according to claim 1 wherein the plurality of elongate scintillators form a detector having a front face, and the controller receives the electrical signals, generates a gross direction of incidence of the incident radiation from said signals, without considering the presence or absence of collimation and rejects at least some incident radiation particles that do not come from a direction at which a suspected source is situated.

20. A detector according to claim 7 wherein the plurality of elongate scintillators form a detector having a front face, wherein the front face is not flat, and wherein alternating portions of the front face extend further front than other portions.

21. A detector according to claim 1 wherein a plurality of said arrays are stacked in a direction perpendicular to the direction of said array to form a two dimensional array of said elongate scintillator segments.

22. A detector according to claim 1 wherein said plurality of scintillator segments comprise a plurality of segments formed of a series of light reflecting low atomic weight partitions placed in a vessel filled with liquid scintillator material, such that the partitions form the individual elongate segments.

23. A detector according to claim 1 wherein the controller that receives the electrical signals generates a timestamp reflecting the time that the light arrives at the light sensors.

24. A detector according to claim 23 wherein the signals are proportional to the total energy deposited in the detector by the incident particle.

25. A detector according to claim 24 wherein the light sensors are photomultiplier tubes (PMTs).

26. A detector according to claim 25 wherein the controller corrects the timestamps for systematic variations of individual PMT channel delays.

27. A detector according to claim 24 wherein the controller corrects the signals for loci dependent light collection efficiency systematic variations.

28. A detector according to claim 21 wherein the thickness of the stacks is deep enough to allow full energy deposition in the detector for more than 60% of 2.6 MeV gamma particles incident at the center of the front face.

29. At least one detector according to claim 1 utilized in a screening portal having a lane, wherein a detector is placed at one side of the lane.

30. A pair of detectors according to claim 1 utilized in a screening portal having a lane, wherein a detector is placed at each side of the lane.

31. A plurality of detectors according to claim 1 wherein the detectors are spaced to form a plurality of vehicle lanes and where a single detector is utilized to detect radiation from adjoining lanes.

32. At least one detector according to claim 1 utilized in a screening portal lane wherein the at least one detector surrounds at least 50% of the lane.

33. At least one detector according to claim 32 wherein the at least one detector surrounds at least 75% of the lane.

34. At least one detector according to claim 32 wherein the at least one detector completely surrounds the lane.

35. A detector according to claim 1 mounted in a vehicle to provide a portable nuclear threat screening device.

36. A detector according to claim 1 wherein the controller receives said signals and determines whether time spaced scintillations that occur in different scintillator segments are from interactions resulting from a same or a different incident particle entering the detector.

37. A detector according to claim 16 wherein the detector function is disguised or hidden so that it detects threats in a covert manner.

38. A detector according to claim 16 including:
a source of activating radiation that stimulates emission of radiation from SNM and radiation shielding, wherein the scintillator segments are positioned to receive said stimulated emission.

39. A plurality of detectors according to claim 1; wherein the controller receives the electrical signals and generates a tomographic image of sources of the radiation.

40. A detector according to claim 1 wherein the scintillator is a PPO based liquid scintillator.

41. An SNM detection system utilizing a detector according to claim 1, effective to screen vehicles moving at a velocity greater than 40 MPH.

42. A method of utilizing a detector according to claim 1 in an SNM detection system, comprising screening a suspected item by placing it before at least one detector while the item is stationary to increase the number of incident particles detected by the detector.

43. A detector according to claim 1 wherein, for signals resulting from scintillations generated in different detector segments which are identified as resulting from a single incident particle, the controller utilizes the signals from a plurality of detector segments to estimate the energy of the incident particle.

44. A detector according to claim 1 wherein the controller receives a plurality of time resolvable signals each representing different scintillations in a same scintillator segment and determines whether the scintillations are from interactions resulting from a same or a different incident particle entering the detector.

45. A detector according to claim 1 wherein the controller receives one or more time resolvable signals each representing different scintillations in a same scintillator segment and determines whether time resolvable scintillations that occur in the same scintillator segment and in scintillations that occur in different scintillator segments are from interactions resulting from a same or a different incident particle entering the detector.

46. A detector for detecting nuclear radiation threats, the detector comprising:
a plurality of elongate scintillator segments arranged in a side by side array; and
at least one pair of light sensors optically coupled to ends of each of the elongate scintillator segments such that they receive light from scintillations produced in the scintillator segments and generate electrical signals responsive thereto;
wherein the plurality of elongate scintillators segments form a detector having a front face, wherein the front face is not flat, and wherein alternating portions of the front face extend further front than other portions.

47. A detector according to claim 46 wherein the scintillator segments comprise an organic scintillator.

48. A detector according to claim 47 wherein the organic scintillator is a liquid organic scintillator.

49. A detector for detecting nuclear threats, the detector comprising:
a plurality of elongate scintillator segments arranged in a side by side array;
at least one pair of light sensors optically coupled to ends of each of the elongate scintillator segments such that they receive light from scintillations produced in the scintillator segments and generate electrical signals responsive thereto; and
a controller that receives said signals and determines whether time spaced scintillations that occur in different scintillator segments are from interactions resulting from a same or a different photon entering the detector.

* * * * *